United States Patent
Matsubara et al.

(10) Patent No.: US 7,492,983 B2
(45) Date of Patent: Feb. 17, 2009

(54) OPTICAL CIRCUIT DEVICE

(75) Inventors: Noritaka Matsubara, Tokyo (JP);
Hiroshi Kawashima, Tokyo (JP);
Kazutaka Nara, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 11/659,226

(22) PCT Filed: Aug. 4, 2005

(86) PCT No.: PCT/JP2005/014310

§ 371 (c)(1),
(2), (4) Date: Aug. 30, 2007

(87) PCT Pub. No.: WO2006/013928

PCT Pub. Date: Feb. 9, 2006

(65) Prior Publication Data
US 2008/0031566 A1    Feb. 7, 2008

(30) Foreign Application Priority Data
Aug. 4, 2004 (JP) .............................. 2004-228221

(51) Int. Cl.
*G02B 6/12* (2006.01)
(52) U.S. Cl. ....................................................... 385/14
(58) Field of Classification Search .................... 385/14
See application file for complete search history.

(56) References Cited

U.S. PATENT DOCUMENTS 5,905,823 A * 5/1999 Shintaku et al. ............... 385/11
5,946,129 A * 8/1999 Xu et al. ...................... 359/332
6,862,130 B2 * 3/2005 Batchko et al. .............. 359/326
2003/0087121 A1 * 5/2003 Domash et al. .............. 428/641

(Continued)

FOREIGN PATENT DOCUMENTS

JP    2001 264567    9/2001

(Continued)

OTHER PUBLICATIONS

Doerr, C. R. et al., "An Automatic 40-Wavelength Channelized Equalizer", IEEE Photonics Technology Letters, vol. 12, No. 9, pp. 1195-1197, 2000.

(Continued)

*Primary Examiner*—Charlie Peng
(74) *Attorney, Agent, or Firm*—Oblon, Spivak, McClelland, Maier & Neustadt, P.C.

(57) ABSTRACT

The present invention provide an optical circuit device having: an optical circuit; a polarization beam splitter/combiner for splitting an incoming light beam into two polarization beams and combining the two polarization beams into an outgoing light beam; a first optical waveguide and a second optical waveguide for connecting the optical circuit and the polarization beam splitter/combiner and receiving the two polarization beams independently; and a polarization rotator, arranged on the first optical waveguide, for rotating a polarization plane of one of the two polarization beams split by the polarization beam splitter/combiner so as to match a polarization plane of the other of the two polarization beams, the optical circuit, the polarization beam splitter/combiner, the first optical waveguide, the second optical waveguide and the polarization rotator being integrated on a planar substrate.

11 Claims, 16 Drawing Sheets

U.S. PATENT DOCUMENTS

2008/0031566 A1    2/2008    Matsubara et al.

FOREIGN PATENT DOCUMENTS

JP           2004 199046         7/2004

OTHER PUBLICATIONS

Saida, T. et al., "Planar Lightwave Circuit Polarization-Mode Dispersion Compensator", IEEE Photonics Technology Letters, vol. 14, No. 4, pp. 507-509, 2002.

Saida, T. et al., "Dynamic Gain Equalisation Filter Based on Integrated Optical Transversal Filter with Asymmetric Combiner", Electronics Letters, Vo. 38, No. 12, pp. 560-561, 2002.

Gehler, J. et al., "Dynamic Adaptation of a PLC Residual Chromatic Dispersion Compensator at 40GB/s", Optical Fiber Communications Conference, vol. 2, pp. 750-751, 2003.

Kawashima, H. et al., "PLC Type Low PDL Variable Optical Attunuator", Technical Report of IEICE, vol. 104, No. 65, pp. 19-24, 2004.

U.S. Appl. No. 12/041,231, filed Mar. 3, 2008, Hasegawa et al.

U.S. Appl. No. 12/056,892, filed Mar. 27, 2008, Nara.

* cited by examiner ially with the many connections between the optical circuit device 1000

OPTICAL CIRCUIT DEVICE

TECHNICAL FIELD

The present invention relates to an optical communication field.

BACKGROUND ART

Conventionally, among optical components used in a DWDM (Dense Wavelength Division Multiplexing) system an optical component using a planar lightwave circuit (PLC) comes into practical use in a splitter or the like and is regarded as an up-and-coming device in view of high controllability and stability. With an eye toward development of the DWDM system in future, optical circuits using a PLC to serve as a dynamic gain equalizer, a tunable dispersion compensator and the like have been already developed.

Generally used to exhibit variable characteristics in these optical circuits is the thermo-optic effect. The thermo-optic effect is such a phenomenon that the refractive index of a silica glass or the like varies depending on the temperature. When the refractive index of an optical waveguide is changed with the thermo-optic effect, the effective refractive index of the temperature-changed portion of the optical waveguide is changed, which causes a change in phase of light propagating therethrough. With use of this, a variable waveguide interferometer is configured thereby to realize the variable characteristics.

Here, description is made about a configuration using a conventional dynamic gain equalizer with reference to FIGS. 14(a), 14(b) and 15. FIG. 14(a) shows gain profiles of an optical amplifier and a dynamic gain equalizer relative to wavelengths in the configuration of the conventional dynamic gain equalizer and FIG. 14(b) shows gain flattening profiles relative to the wavelengths.

In FIGS. 14(a) and 14(b), the dynamic gain equalizer manufactured with a PLC using the thermo-optic effect was used. The gain profile of the optical amplifier shown in FIG. 14(a) was subjected to flattening by the dynamic gain equalizer, which result is shown in FIG. 14(b). The insertion loss in this case was 7.0 dB.

FIG. 14(b) shows that the gain profile of the optical amplifier was flattened at a practical level for TE (Transverse Electro) polarization beam. However, for TM (Transverse Magnetic) polarization beam, the profile was not flattened and there occurred an extremely large PDL (Polarization Dependent Loss) of 4.5 dB or more. This PDL may be 10 dB or more depending on the wavelength characteristic of the optical amplifier, which sometimes becomes a significant obstacle to practical application. One of reasons for the large PDL is that heating by a heater in the dynamic gain equalizer causes anisotropic stress within the PLC and this stress produces a birefringence in the optical waveguide, which results in causing polarization dependence of the propagation characteristic.

In order to reduce the PDL, an optical circuit device 1000 shown in FIG. 15 is used (see e.g. non-patent document 1). FIG. 15 shows a configuration of the optical circuit device 1000. The optical circuit device 1000 includes an optical circuit 1010 of PLC, a polarization beam splitter/combiner 1020 and PMFs (polarization maintaining optical fibers) 1031 and 1032. The optical circuit 1010 and the polarization beam splitter/combiner 1020 are connected via the PMFs 1031 and 1032. The polarization beam splitter/combiner 1020 is connected to a circulator 200 via an SMF (single mode optical fiber) 300.

Light passing through the circulator 200 is first input to the polarization beam splitter/combiner 1020 via the SMF 300 and split into two polarization beams having polarization planes orthogonal to each other (for example, TE polarization beam and TM polarization beam in FIG. 15). One split beam (TM polarization beam in FIG. 15) has the polarization plane rotated 90 degree by rotation of the PMF 1032 and is input to the optical circuit 1010 (as TE polarization beam in FIG. 15). Then, the beam output from the optical circuit 1010 is combined at the polarization beam splitter/combiner 1020. The other split beam (TE polarization beam in FIG. 15) is input to the optical circuit 1010 while maintaining its polarization plane. Then, the beam output from the optical circuit 1010 has the polarization plane rotated by 90 degree and combined at the polarization beam splitter/combiner 1020. In other words, as there exists only one type of polarization beam in the optical circuit 1010 (only TE polarization beam in FIG. 15), PDL does not occur in principle.

Non-patent document 1: Doerr, "An Automatic 40-Wavelength Channelized Equalizer", IEEE Photonics technology Letters, vol. 12, No. 9, September 2000, p. 1195

SUMMARY OF THE INVENTION

Problems to be Solved by the Invention

In the optical circuit device 1000 illustrated in FIG. 15, in order to eliminate polarization dependence, it is necessary to match polarization planes of the PMFs 1031, 1032 and the optical circuit 1010 completely when connecting them. However, axial adjustment of the optical axes between the PMFs and the optical component is difficult and there actually occurs misalignment. This may cause a problem of deterioration of polarization extinction ratio and finally PDL.

In addition, in the optical circuit device 1000, as there are many connections between the optical components, for example, between the optical circuit 1010 and each of the PMFs 1031 and 1032, between the polarization beam splitter/combiner 1020 and each of the PMFs 1031 and 1032, and between the polarization beam splitter/combiner 1020 and the SMF 300, there are problems of large connection loss and insertion loss of the optical circuit device 1000.

Associated with the many connections between the optical components in the optical circuit device 1000, there is another problem of high connection cost. Further, the many connections between the optical components also present a problem of decreased reliability of the connections.

Further, in the optical circuit device 1000, there is a problem that installation of the PMFs 1031 and 1032 induces upsizing of modules. Furthermore, the PMF blocks of the PMFs 1031 and 1032 having aligned stress attribution directions are expensive and the cost becomes high in total.

The present invention has an object to provide an optical circuit device for splitting an incoming light beam into two polarization beams to be input to an optical circuit thereby to reduce PDL and insertion loss.

Means for Solving the Problems

A first aspect of an optical circuit device of the present invention is an optical circuit device having:
 an optical circuit;
 a polarization beam splitter/combiner for splitting an incoming light beam into two polarization beams and combining the two polarization beams into an outgoing light beam;

a first optical waveguide and a second optical waveguide for connecting the aforementioned optical circuit and the aforementioned polarization beam splitter/combiner and receiving the two polarization beams independently; and a polarization rotator, arranged on the first optical waveguide, for rotating a polarization plane of one of the two polarization beams split by the aforementioned polarization beam splitter/combiner so as to match a polarization plane of the other of the two polarization beams, the aforementioned optical circuit, the aforementioned polarization beam splitter/combiner, the aforementioned first optical waveguide, the aforementioned second optical waveguide and the aforementioned polarization rotator being integrated on a planar substrate.

A second aspect of the optical circuit device of the present invention is an optical circuit device in which the aforementioned polarization beam splitter/combiner has polarization beam splitting/combining circuits each having a polarization beam splitting/combining function, the polarization beam splitting/combining circuits being cascaded at at least two stages on the planar substrate.

A third aspect of the optical circuit device of the present invention is an optical circuit device in which the aforementioned polarization rotator is a half wave plate.

A fourth aspect of the optical circuit device of the present invention is an optical circuit device in which the aforementioned optical circuit has a characteristic adjusting function by use of a thermo-optic effect.

A fifth aspect of the optical circuit device of the present invention is an optical circuit device in which the aforementioned optical circuit is a dynamic gain equalizer.

A sixth aspect of the optical circuit device of the present invention is an optical circuit device in which the aforementioned optical circuit is a transversal filter.

A seventh aspect of an optical circuit device of the present invention is an optical circuit device in which the aforementioned optical circuit is a tunable dispersion compensator.

An eighth aspect of the optical circuit device of the present invention is an optical circuit device in which the aforementioned optical circuit is a variable optical attenuator.

A ninth aspect of the optical circuit device of the present invention is an optical circuit device in which the aforementioned optical circuit is an optical switch.

A tenth aspect of the optical circuit device of the present invention is an optical circuit device further including a monitor input waveguide and a monitor output waveguide formed connected to the aforementioned optical circuit in the planar substrate.

An eleventh aspect of the optical circuit device of the present invention is an optical circuit device in which the aforementioned optical circuit is a tunable dispersion compensator using a transversal filter circuit.

A twelfth aspect of an optical circuit device of the present invention is an optical circuit device in which the polarization beam splitting/combining circuits cascaded are configured by connecting a through port and a cross port.

Effect of the Invention

According to the present invention, as an incoming light beam is split into two polarization beams by the polarization beam splitter/combiner, one of the polarization beam has a polarization plane rotated by the polarization rotator so as to match the polarization plane with that of the other polarization beam and input to the optical circuit, there only exists polarization beams of the same polarization plane in the optical circuit. Besides, as no PMF is used, the polarization extinction ratio is not deteriorated and the PDL can be reduced significantly. Further, as no PMF is used, there is no connection between the PMF and any other component, and therefore, the insertion loss and the connection cost can be reduced significantly and the reliability of the connection can be enhanced. Furthermore, as no PMF is used, there is no need to consider installation of the PMF, and therefore, modules of the optical circuit device can be downsized. Furthermore, as there is no expensive PMF block used, the fabrication cost of the optical circuit device can be reduced.

In addition, according to the present invention, as polarization beam splitting/combining circuits are cascaded at at least two stages, the incoming light beam can be split clearly into two polarization beams and a higher polarization extinction ratio can be obtained.

Further, according to the present invention, as the half wave plate is used, one of the two polarization beams having polarizations orthogonal to each other can be input to the optical circuit after its polarization plane is rotated by 90 degree so as to match the polarization plane of the other polarization beam.

Further, according to the present invention, it is possible to reduce the PDL and insertion loss in the optical circuit having characteristic adjusting function by use of the thermo-optic effect.

According to the present invention, in the dynamic gain equalizer, it is possible to reduce the PDL and insertion loss.

Further, according to the present invention, in the transversal filter, it is possible to reduce the PDL and insertion loss.

Furthermore, according to the present invention, in the tunable dispersion compensator, it is possible to reduce the PDL and insertion loss.

According to the present invention, in the variable optical attenuator, it is possible to reduce the PDL and insertion loss.

Further, according to the present invention, in the optical switch, it is possible to reduce the PDL and insertion loss.

Furthermore, according to the present invention, as test light is input to the optical circuit via the monitor input waveguide and light output from the optical circuit via the monitor output waveguide is measured, it is possible to measure optical characteristics of the optical circuit without any other optical component and to adjust the characteristics of the optical circuit based on the result of the optical characteristics.

EXPLANATION OF SYMBOLS

Figure 1:
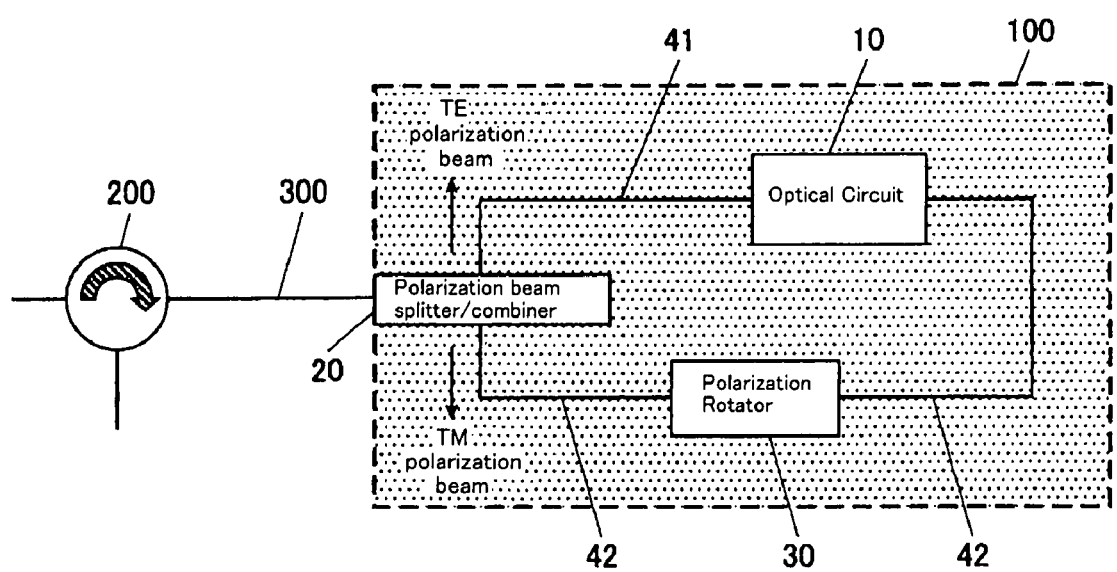
FIG. 1 is a view illustrating a configuration of an optical circuit device 100 according to a first embodiment of the present invention.

100, 100A, 100B, 100C, 100X, 100Y, 400, 400A, 1000 Optical circuit device
200 circulator
300 SMF
10, 1010 optical circuit
10A, 10B dynamic gain equalizer
11 multistage optical coupler
12, 12B optical connection circuit
13 multistage optical coupler
14, 17, 18, 19 optical coupler
15a to 15h, 15i to 15p, 15B optical delay line
16, 16B phase adjusting means
20, 20A, 20B, 1020 polarization beam splitter/combiner
21, 22 optical coupler
30 polarization rotator
30A half wave plate
41, 42 optical waveguide
10C, 10D, 50 tunable dispersion compensator
11C, 14C, 51, 55 slab waveguide
12C, 52 array optical waveguide
12Ca, 52a channel waveguide
13C, 53 phase adjusting unit
13Ca, 53a phase shifter
31 waveguide type polarization beam splitter/combiner
32 half wave plate
54 characteristic adjuster
54a characteristic adjusting heater
61 monitor input waveguide
62 monitor output waveguide
1031, 1032 PMF

BEST MODE FOR CARRYING OUT THE INVENTION

With reference to the drawings, a first embodiment and a second embodiment of the present invention will be described below.

First Embodiment

The first embodiment of the present invention is described with reference to FIG. 1. First explanation is made about a configuration of an optical circuit device 100 of the present embodiment referring to FIG. 1. FIG. 1 illustrates the configuration of the optical circuit device 100.

As illustrated in FIG. 1, the optical circuit device 100 is a PLC and includes on a planar substrate, an optical circuit 10i a polarization beam splitter/combiner 20, a polarization rotator 30, optical waveguides 41 and 42, which are all monolithically integrated in one chip. The polarization beam splitter/combiner 20 formed on the optical circuit device 100 is connected to a circulator 200 via a SMF 300.

The polarization beam splitter/combiner 20 is connected to the optical circuit 10 via the two paths of the optical waveguides 41 and 42. Besides, the polarization rotator 30 is provided on the optical waveguide 42.

The optical circuit 10 is, for example, a dynamic gain equalizer or the like. The polarization beam splitter/combiner 20 serves to divide an incident light beam from the circulator 200 into two polarization beams having polarization planes orthogonal to each other, combine two polarization beam and output light to the circulator 200 as an outgoing light beam.

First, the incident light beam which has passed through the circulator 200 is input to the polarization beam splitter/combiner 20. In the optical circuit device 100, the beam is divided into two polarization beams having polarization planes orthogonal to each other (TE polarization beam and TM polarization beam in the present embodiment). The divided polarization beams propagate in the optical waveguides 41 and 42, respectively, of the optical circuit device 100 while keeping the respective polarizations. One of the polarization beams (TM polarization beam in FIG. 1) has polarization plane 90 degree rotated by the polarization rotator 30 provided in the optical waveguide 42, and is input into the optical circuit 10 as a TE polarization beam. Then, the light beam is output from the optical circuit 10 and combined at the polarization beam splitter/combiner 20. The other polarization beam divided by the polarization beam splitter/combiner 20 (TE polarization beam in FIG. 1) is input into the optical circuit 10 while keeping polarization, then output from the optical circuit 10, has its polarization plane 90 degree rotated by the polarization rotator 30 and is combined by the polarization beam splitter/combiner 20.

Hence, in the optical circuit 10 there exists only one type of polarization beam (TE polarization beam in FIG. 1) and the optical circuit device 100 has polarization diversity. Therefore, PDL does not occur in principle. In addition, as a property of keeping polarization in the optical circuit device 100 is utilized, there is no need to use a PMF.

As described up to this point, in the present embodiment, when an incident beam is divided into two polarization beams having polarization planes orthogonal to each other and the two polarization beams are input to the optical circuit 10 in the optical circuit device 100, only one polarization beam exists in the optical circuit 10. Besides, the optical circuit device 100 does not use PMF. Therefore, there is no connection between the PMF and another optical component, and therefore, there is no deterioration of polarization extinction ratio due to shift of polarization angle in connection thereby reducing PDL drastically.

Figure 15:
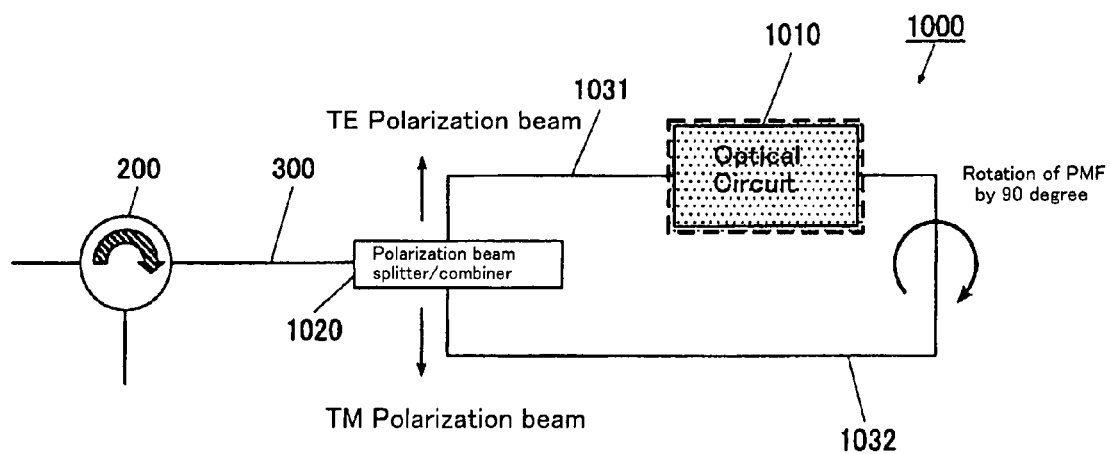
FIG. 15 is a view illustrating the configuration of the optical circuit device 1000.

In addition, in the conventional optical circuit device 1000 illustrated in FIG. 15, there are no less than five connections between optical components, (two connections between the optical circuit 1010 and the PMFs 1031 and 1032, respectively, two connections between the polarization beam splitter/combiner 1020 and the PMFs 1031 and 1032, respectively, and one connection between the SMF 300 and the polarization beam splitter/combiner 1020), which induces a large connection loss. In the configuration of the present embodiment, as connection is reduced to be one between the SMF 300 and the optical circuit device 100 (the polarization beam splitter/combiner 20), the connection loss can be reduced and insertion loss into the optical circuit device 100 can be reduced drastically. Further, as connection can be reduced in number, connection cost can be reduced substantially. Furthermore, reduction of connection leads to enhancement in reliability at connection.

Besides, as no PMF is used, installation of PMF is not required, and therefore, a module size of the optical circuit device is allowed to be reduced. In addition, as no expensive PMF block is used, the fabriacation cost of the optical circuit device is allowed to be reduced.

Second Embodiment

Figure 2:
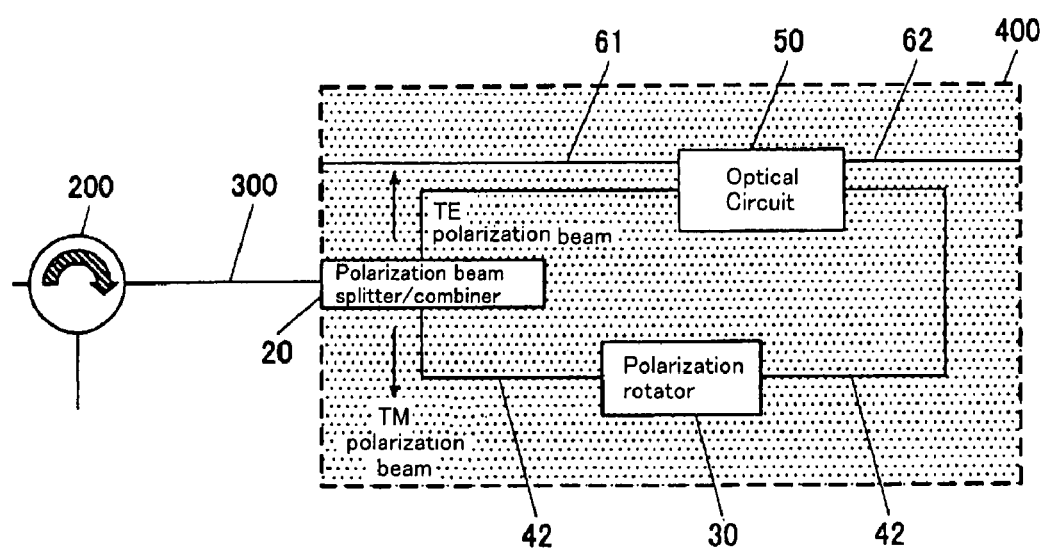
FIG. 2 is a view illustrating a configuration of an optical circuit device 400 according to a second embodiment of the present invention.

Next description is made about a second embodiment of the present invention with reference to FIG. 2. First, the configuration of an optical circuit device 400 of this embodiment is described with reference to FIG. 2. FIG. 2 illustrates the optical circuit device 400 of this embodiment.

As illustrated in FIG. 2, the optical circuit device 400 of this embodiment is a PLC and has an optical circuit 50, a polarization beam splitter/combiner 20, a polarization rotator 30, optical waveguides 41 and 42, a monitor input waveguide 61 and a monitor output waveguide 62, which are all monolithically integrated in one chip. In other words, the optical circuit device 400 is configured by adding the monitor input waveguide 61 and the monitor output waveguide 62 to the optical circuit device 100 of the first embodiment. In the description below, portions having the same functions as those illustrated in the above-described figure are indicated by the same numerals and description thereof is omitted.

The monitor input waveguide 61 is connected to the optical circuit 50 and guides test light to be input to the optical circuit 50 for monitoring. The monitor output waveguide 62 is connected to the optical circuit 50 and guides test light output from the optical circuit 50 for monitoring.

The configuration of inputting optical signals to and outputting optical signals from the optical circuit 50 by splitting and combining of incoming light beams in the optical circuit device 400 (polarization diversity configuration) is the same as that in the first embodiment. The monitoring operation of the optical circuit 50 in the optical circuit device 400 includes: inputting a monitoring test light beam into the optical circuit 50 via the monitor input waveguide 61, outputting the monitoring test light beam from the optical circuit 50 via the monitor output waveguide 62 and measuring the test light beam. Such monitoring operation enables understanding of the optical characteristics of the optical circuit 50 and adjusting of the characteristics of the optical circuit 50 based on the optical characteristics result before installing of the circulator 200 or without using the polarization beam splitter/combiner 20.

According to the second embodiment, it becomes easier to evaluate the characteristics of the optical circuit 50 formed in the PLC optical circuit device 400 when the device is in one PLC chip and not yet connected to the circulator 200. It becomes also easier to select a PLC chip and adjust the characteristics before assembling or setting up of the circulator 200. In addition, when the performance is evaluated after setting up of the circulator 200, it becomes possible to measure the characteristics of the optical circuit 50 precisely without being affected by the optical characteristics of the polarization beam splitter/combiner 20.

EXAMPLE 1

Figure 3:
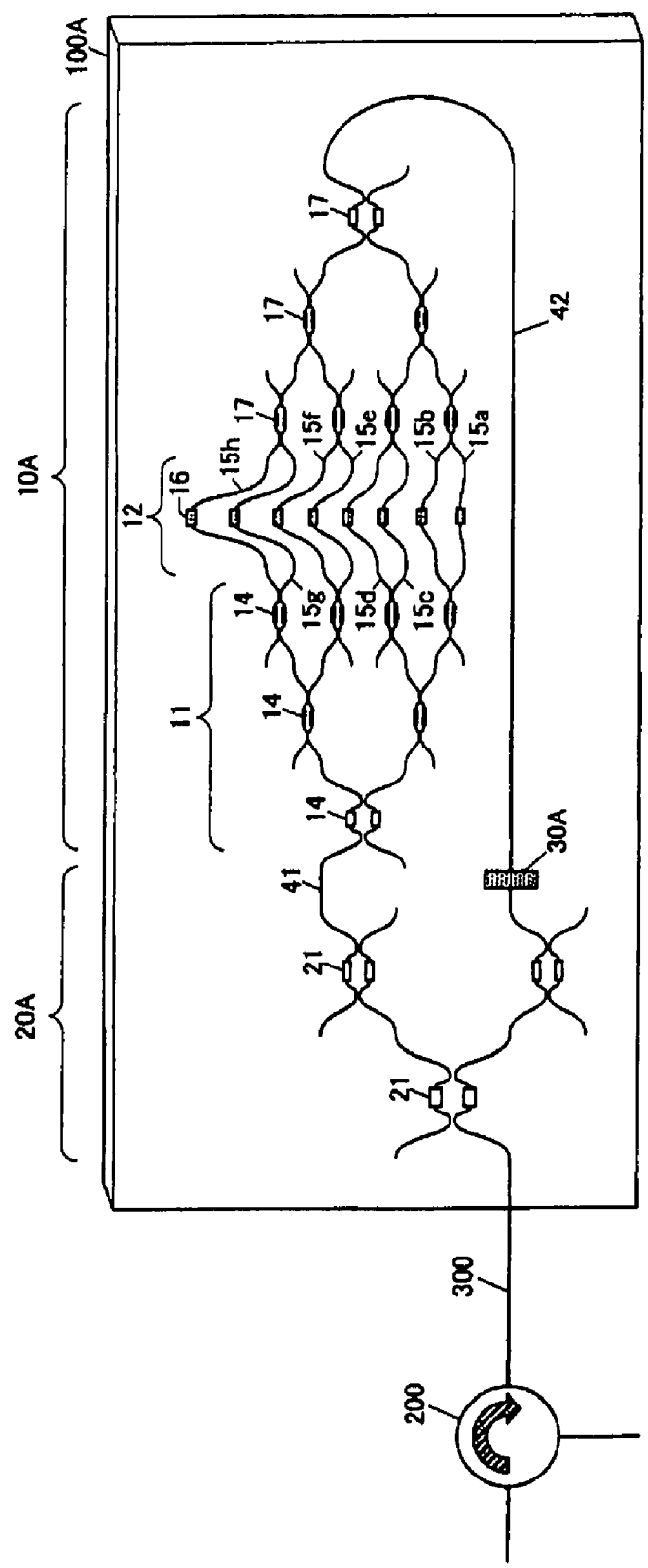
FIG. 3 is a view illustrating a configuration of an optical circuit device 100A as an example 1 according to the first embodiment.

With reference to FIGS. 3 and 4, described as a specific example 1 of the above-described embodiment 1 is a configuration in which a dynamic gain equalizer having characteristic adjusting function by use of the thermo-optic effect is applied the optical circuit 10 of the optical circuit device 100 in FIG. 1. FIG. 3 illustrates the configuration of an optical circuit device 100A of this example.

As illustrated in FIG. 3, the integrated PLC-type optical circuit device 100A of this example is configured to include in the optical circuit device 100 of FIG. 1, a dynamic gain equalizer 10A as the optical circuit 10, a polarization beam splitter/combiner 20A as the polarization beam splitter/combiner 20 and a half wave plate 30A as the polarization rotator 30.

The polarization beam splitter/combiner 20A has optical couplers 21 as optical circuits having the polarization beam splitting and combining function cascaded at two stages in the same substrate. Besides, used as each of the optical couplers is an optical circuit having two directional couplers capable of dividing and combining light while the light is trapped in an optical waveguide and two optical waveguides connecting the couplers. In each optical coupler 21, an effective length difference of the two optical waveguides is in two electric field components orthogonal to each other, different by an integral multiple of incoming light beam wavelength for one electric field component and different by (an integral+½) multiple of the incoming light beam wavelength for the other electric field component. With this configuration, for example, in each of the optical couplers 21, the effective length difference is different by an integral multiple of the incoming light beam wavelength for TE polarization beam and the TE polarization beam is output to a cross port, while the effective length difference different by (an integral+½) multiple of the incoming light beam wavelength for TM polarization beam and the TM polarization beam is output to a through port. That is to say, the TE polarization beam and TM polarization beam can be divided at each of the optical couplers 21.

In this example, two directional couplers and two optical waveguides connecting them are combined to constitute each optical coupler 21 (directional coupler+two waveguides+directional coupler). However, the optical coupler 21 is not limited to this configuration. The optical coupler 21 may be configured by a combination of at least two directional couplers and two optical waveguides connecting them. In addition, in each optical coupler 21, the directional couplers may be replaced with Y branch circuits, MMI (Multi Mode Interference) circuits or a combination of them. For example, each optical coupler 21 may be configured to have (Y branch circuit+two optical waveguides+Y branch circuit), (MMI circuit+two optical waveguides+MMI circuit), (directional coupler+two optical waveguides+Y branch circuit), (directional coupler+two optical waveguides+MMI circuit) or (Y branch circuit+two optical waveguides+MMI circuit). Further, in the polarization beam splitter/combiner 20A, two optical couplers 21 of different configurations may be combined. Which optical coupler to use can be determined as appropriate in consideration of wavelength characteristics of the polarization beam splitting and combining function and a fabrication error of an optical coupler.

The half wave plate 30A is a birefringent plate for rotating the polarization plane of an incoming beam by 90 degree to output the beam. The dynamic gain equalizer 10A utilizes a transversal filter type optical circuit. In addition, no PMF is used in the optical circuit device 100A, and the optical circuit device 100A and the circulator 200 are connected by a SMF 300.

Next description is made about fabrication of the optical circuit device 100A. A silica-based glass under clad film and a core film are formed on a silicon substrate using flame hydrolysis deposition, then, a photo mask drawing the dynamic gain equalizer 10A and the polarization beam splitter/combiner 20A illustrated in FIG. 2 is used to conduct photolithography, and patterning of the core is performed using reaction ion etching. Thereafter, flame hydrolysis deposition is used again to form an over clad film on the silicon substrate.

This is followed by sputtering to form Ti/Ni heaters provided on the optical couplers 21 as a polarization beam splitter/combiner, the optical couplers 14, phase adjusting means 16 on optical delay lines 15a to 15h and optical couplers 17. Besides, Ti/Ni/Au electrode is given for power feeding and an integrated PLC of the dynamic gain equalizer 10A and the polarization beam splitter/combiner 20A is fabricated.

Further, in one optical waveguide 42 connecting the dynamic gain equalizer 10A and the polarization beam splitter/combiner 20A, a groove is formed by dicing and a polyimide half wave plate 30A is inserted to form the optical circuit device 10A. Finally, the circulator 200 and the optical circuit device 100A are connected by the SMF 300 to constitute polarization diversity.

Thus in the optical circuit device 10A, the polarization beam splitter/combiner 20A is configured by two-stage optical couplers 21. Besides, the dynamic gain equalizer 10A is configured by including a multistage optical coupler 11 having three-stage optical couplers 14, an optical connection circuit 12 having phase adjusting means 16 by Ti/Ni heaters on eight optical delay lines 15a to 15h, and a multistage optical coupler 13 having three-stage optical couplers 17.

In the optical couplers 14 and 17 optical amplitude tuning means is configured-by Ti/Ni heaters. In addition, the configuration is limited to this, and the optical amplitude tuning means may be provided on at least one optical coupler of the multistage optical coupler 11 and at least one optical coupler of the multistage optical coupler 13. In addition, the optical amplitude tuning means is described as provided by Ti/Ni heaters the optical coupler 21, however, a configuration is not limited to this and the optical amplitude tuning means may not be provided.

In addition, the number of stages of the optical couplers 21 in the polarization beam splitter/combiner 20A is not limited to two, and preferably at least two. As the number of stages increases, an incoming light beam can be split definitely and a high polarization extinction ratio can be obtained. Further, the numbers of stages of multistage optical couplers 11 and 13 are not limited to three, and the numbers of optical delay lines and phase adjusting means are also not limited to eight.

Each of the optical delay lines 15a to 15h adds a set time delay depending on its length to propagating light. When the length of the optical delay line 15a is used as a basis, the optical delay line 15b is formed dL longer than the optical delay line 15a. Likewise, the optical delay line 15c, 15d, 15e, 15f, 15g and 15h are formed longer than the optical delay line 15a by 2 dL, 3 dL, 4 dL, 5 dL, 6 dL and 7 dL.

The operation in the optical circuit device 100A starts with an incoming light beam input from the circulator 200 through the SMF 300 being split into a TE polarization beam and a TM polarization beam by the polarization beam splitter/combiner 20A. The split TE polarization beam is branched by the multistage optical coupler 11, input to the optical connection circuit 12, and subjected to adjustment of the phases of the branched incoming beams by the optical connection circuit 12. The branched TE polarization beams output from the optical connection circuit 12 are combined by the multistage optical coupler 13 and the combined TE polarization beam is changed into a TM polarization beam by the half wave plate 30A and input to the polarization beam splitter/combiner 20A. On the other hand, the TM polarization beam split by the polarization beam splitter/combiner 20A is changed into a TE polarization beam by the half wave plate 30A, and the TE polarization beam is branched by the multistage optical coupler 13. The branched TE polarization beams are subjected to adjustment of the respective phases by the optical connection circuit 12, output from the optical connection circuit 12 and combined by the multistage optical coupler 11. The combined TE polarization beam is input to the polarization beam splitter/combiner 20A. In the polarization beam splitter/combiner 20A, the input TE polarization beam and TM polarization beam are combined to be output to the circulator 200 via the SMF 300.

Figure 4A:
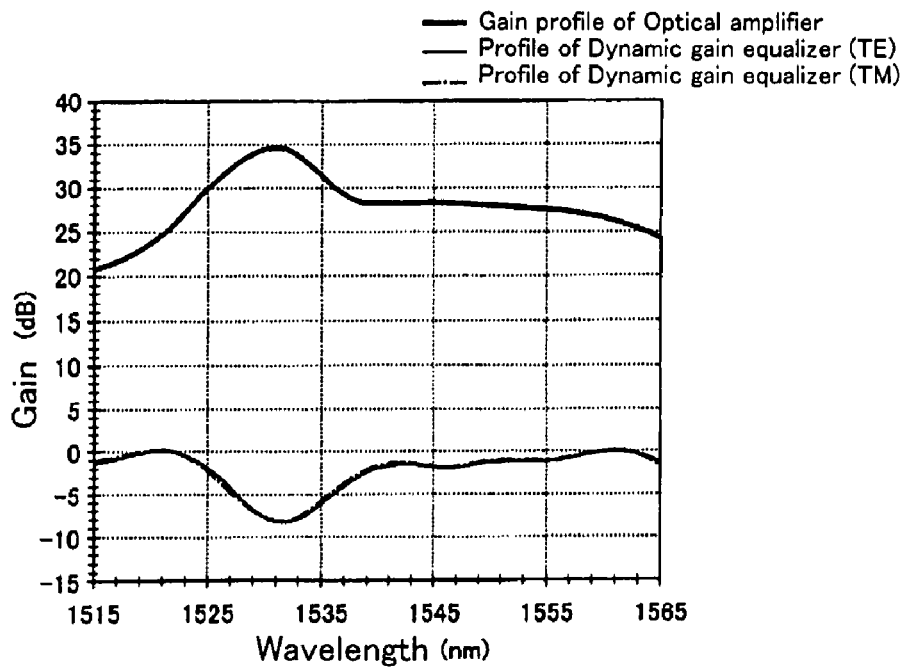
FIG. 4(a) is a view of gain profiles of an optical amplifier and a dynamic gain equalizer relative to wavelengths in the optical circuit device 100A.
Figure 4B:
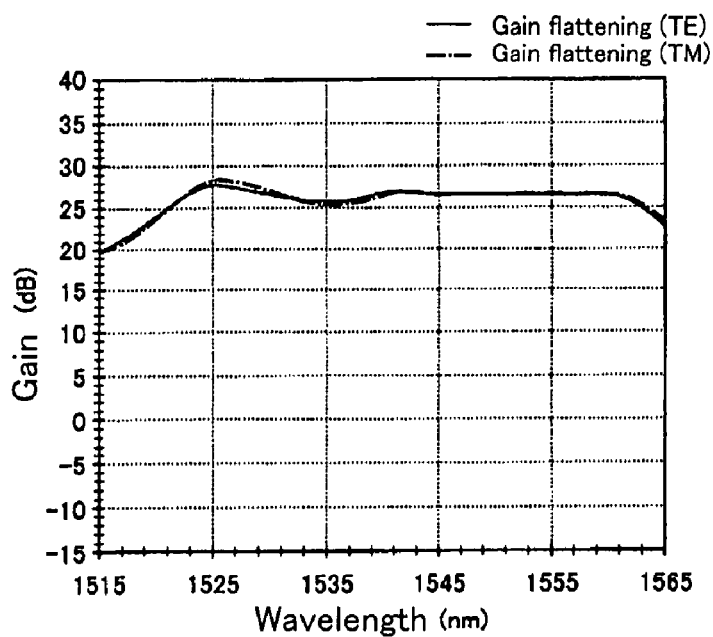
FIG. 4(b) is a view of gain flattening profiles similarly relative to wavelengths.

Next, with reference to FIG. 4, a result of gain flattening of an optical amplifier performed by the optical circuit device 100A. FIG. 4(a) illustrates gain profiles of the optical amplifier and the dynamic gain equalizer relative to the wavelengths in the configuration using the optical circuit device 100A. FIG. 4(b) shows gain flattening similarly relative to the wavelengths.

As is seen from FIGS. 4(a) and 4(b), the optical amplifier gain profile is flattened at the practical level for TE polarization light and TM polarization light in the optical circuit device 100A. At this point, the insertion loss is about 4.5 dB or less, lower loss can be achieved as compared with the configuration without the optical circuit device 100A. This loss includes a propagation loss in the circuits in the PLC, an excess loss of the circuits and a connection loss of the SMF 300 and the circulator 200. The PDL is 0.5 dB or less, and use of the optical circuit device 100A enables significant reduction of the PDL. The polarization extinction ratio of the polarization beam splitter/combiner 20A of cascade configuration is 40 dB or more. According to this example, it is possible to fabricate the optical circuit device 100A of integrated polarization diversity configuration having a low insertion loss and a low PDL.

In addition, as the polarization beam splitter/combiner 20A is integrated in the PLC, the two-stage cascade configuration of the polarization beam splitter/combiner 20A of this example can be fabricated through the same fabrication process of one-stage polarization beam splitter/combiner. Accordingly, improvement of the performance of the polarization beam splitter/combiner 20A can be realized at a low cost.

In the above-described example 1, used as the optical connection circuit 12 is the phase adjusting means 16 provided on the optical delay lines 15a to 15h. However, the optical connection circuit 12 is not limited to this configuration. For example, it can be configured by cascaded optical delay lines 15a to 15h and phase adjusting means 16, or the connection order may be reversed.

EXAMPLE 2

Figure 5:
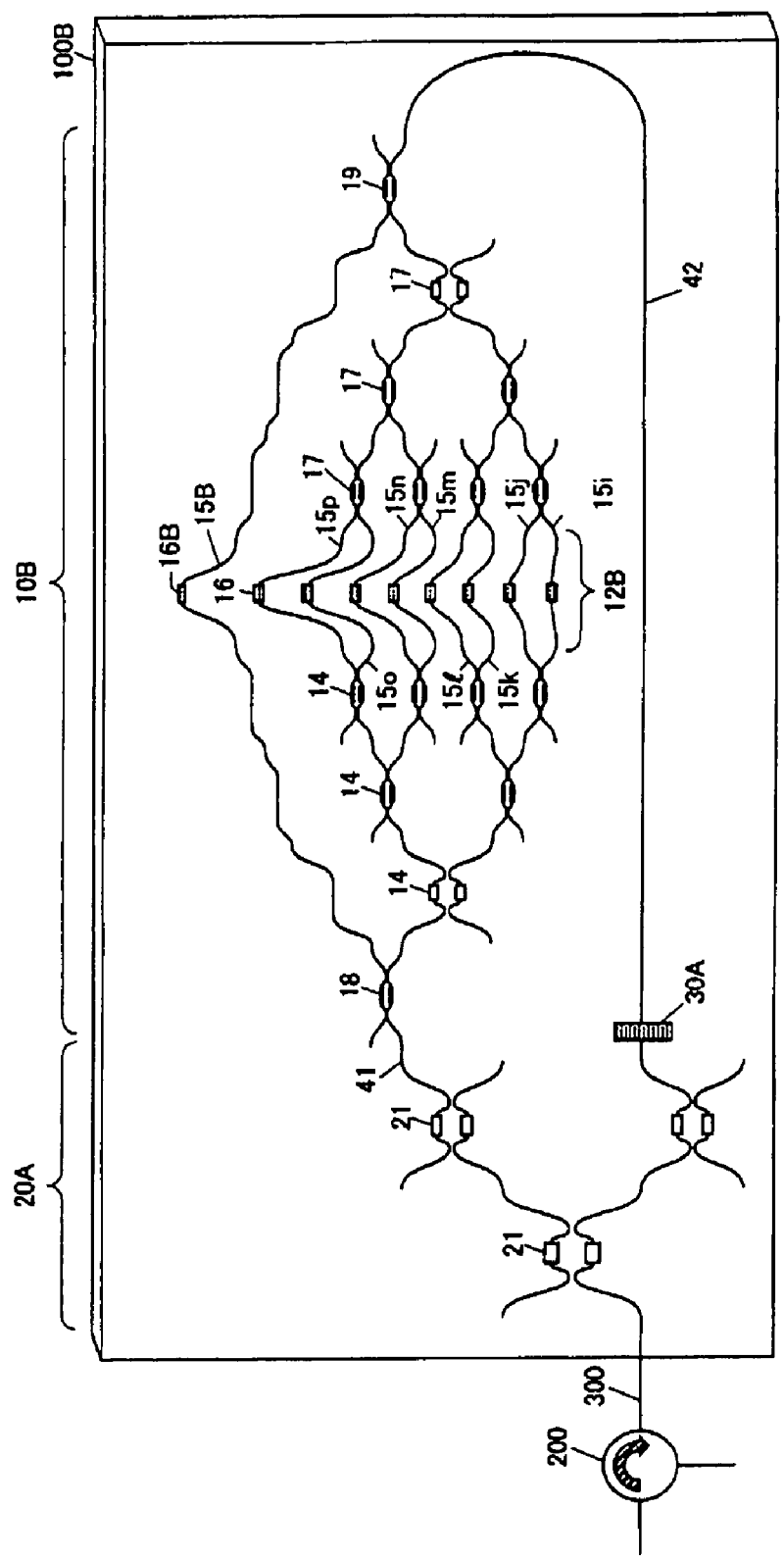
FIG. 5 is a view illustrating a configuration of an optical circuit device 100B as an example 2 according to the first embodiment.

With reference to FIG. 5, described as a specific example 2 of the above-described first embodiment is a configuration where a low-loss type dynamic gain equalizer is applied to the optical circuit 10 of FIG. 1. FIG. 5 illustrates an optical circuit device 100B of this example.

As illustrated in FIG. 5, the integrated PLC type optical circuit device 100B of this example is configured by replacing the dynamic gain equalizer 10A with a dynamic gain equalizer 10B having a low loss and of polarization diversity configuration in the optical circuit device 100A of FIG. 3. The dynamic gain equalizer 10B includes, in addition to the multistage optical coupler 11, the optical connection circuit 12B and the multistage optical coupler 13, an optical coupler 18, phase adjusting means 16B on an optical delay line 15B and an optical coupler 19. The optical connection circuit 12B has phase adjusting means 16 by Ti/Ni heaters on eights optical delay lines 15i to 15p.

The optical delay lines 15j to 15p and the optical delay line 15B are formed longer than the optical delay line 15i by dL, 2 dL, 3 dL, 5 dL, 6 dL, 7 dL, 8 dL and 4 dL. The phase adjusting means 16B is formed with a Ti/Ni heater however may not be formed by the Ti/Ni heater. In addition, the optical delay lines 15i to 15p and the phase adjusting means 16 may be cascaded and the connection order may be reversed. Further, the optical delay line 15B and the phase adjusting means 16B may be cascaded and the connection order may be reversed. In each of the optical couplers 18 and 19, optical amplitude tuning means is formed with a Ti/Ni heater, however it may not be formed.

With the optical circuit device 100B of this example, the gain flattening characteristic is equivalent to that of the optical circuit device 100A of the example 1 and an insertion loss of the optical circuit device 100B is about 3.5 dB or less, which presents much lower loss. In addition, the optical circuit device 100B has a PDL of 0.5 dB or less, which shows ability to reduce the PDL.

EXAMPLE 3

Figure 6:
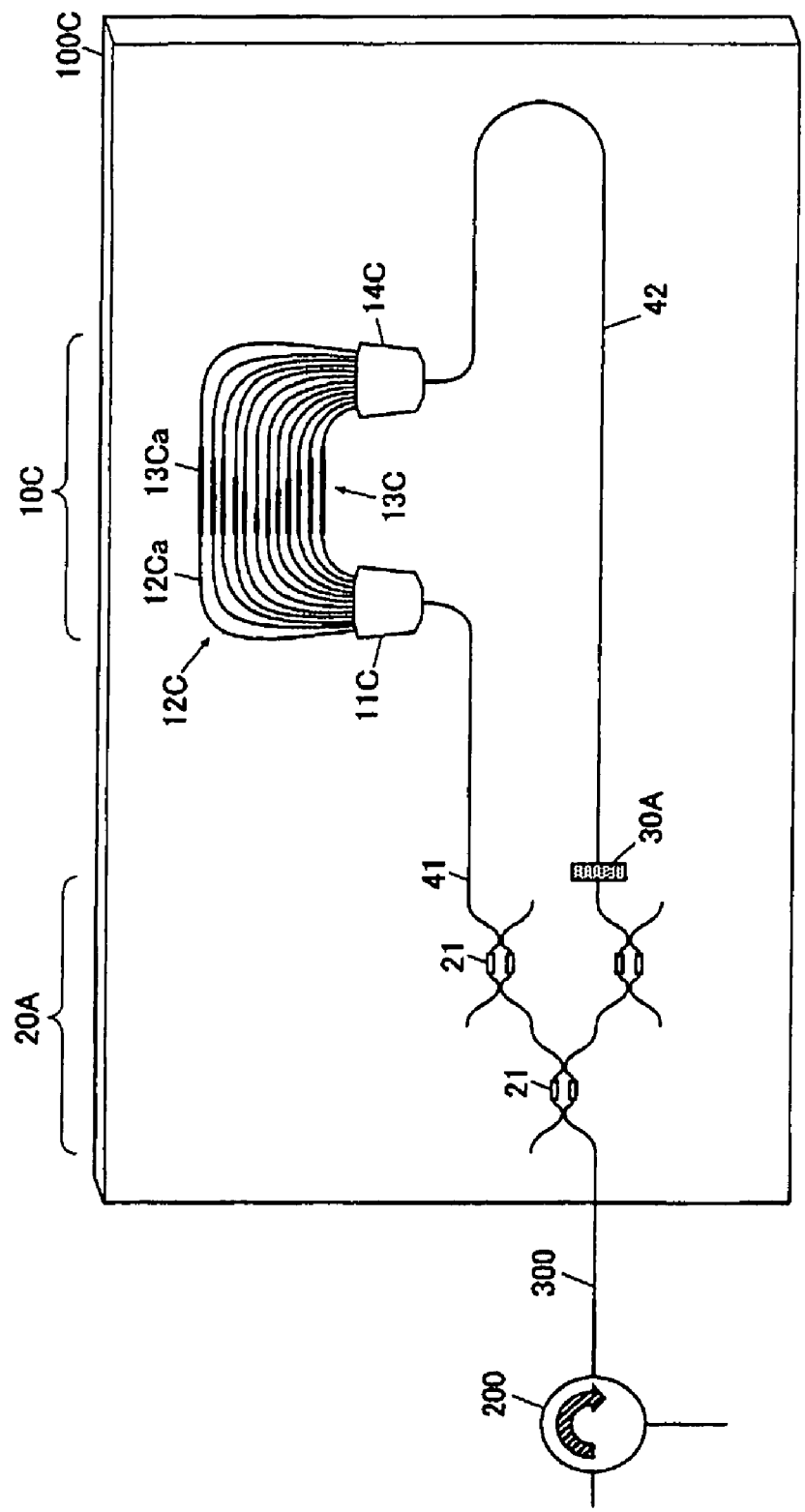
FIG. 6 is a view illustrating a configuration of an optical circuit device 100C as an example 3 according to the first embodiment.
Figure 7:
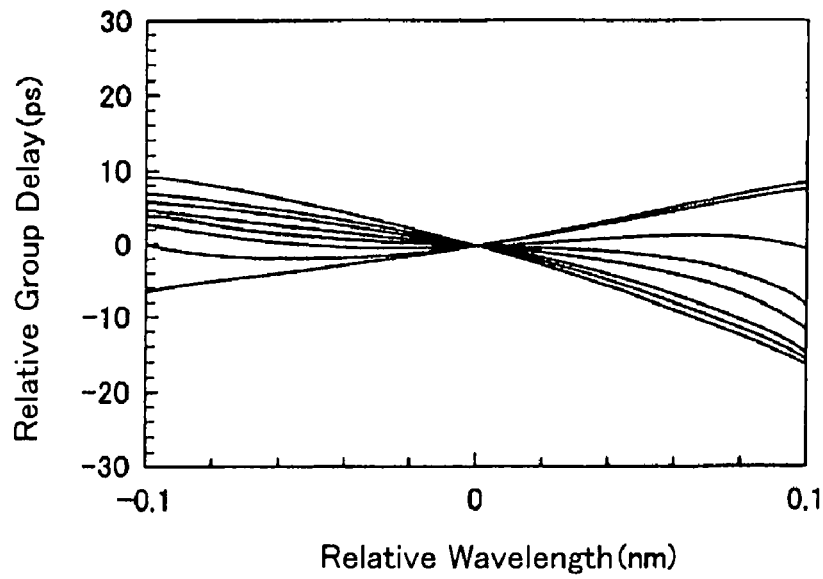
FIG. 7 is a graph of tunable dispersion relative to relative wavelengths in the configuration using the optical circuit device 100C.
Figure 8:
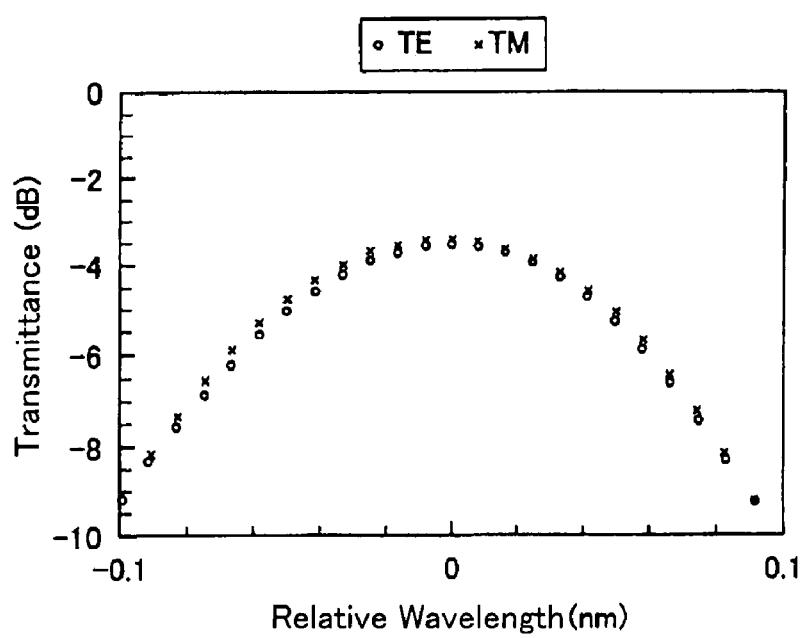
FIG. 8 is a graph of transmittance in the configuration using the optical circuit device 100C.

With reference to FIGS. 6 to 8, described as a specific example 3 of the above-described first embodiment is a configuration where a tunable dispersion compensator of polarization diversity configuration having characteristic adjusting function is applied to the optical circuit 10 of the optical circuit device 100 of FIG. 1. FIG. 6 illustrates the configuration of the optical circuit device 100C of this example.

As illustrated in FIG. 6, the optical circuit device 100C of this example includes the tunable dispersion compensator 10C in place of the dynamic gain equalizer 10A of the optical circuit device 100A of the above-described example 1. Applied to the tunable dispersion compensator 10C is an optical circuit having a phase shifter at an array waveguide portion of an AWG (Arrayed Waveguide Grating) to obtain variable dispersion by adding a phase to propagating light.

The tunable dispersion compensator 10C includes a slab waveguide 11C, an array waveguide 12C having plural channel waveguides 12Ca, a phase adjusting unit 13C having plural phase shifter 13Ca, and slab waveguide 14C linked to the waveguide 42.

The optical circuit device 100 is fabricated by, as is the case with the optical circuit device 100A of the above-described example 1, patterning using a photomask on which the tunable dispersion compensator 10C and the polarization beam splitter/combiner 20A are drawn, forming of Ti/Ni heaters at the plural phase shifters 13Ca by spattering and the like.

Applied to the tunable dispersion compensator 10C is the optical circuit having the phase adjusting unit 13C provided on the AWG array waveguide 12C to obtain variable dispersion by adding phase to propagating light. The respective numbers of the channel waveguides 12Ca and the phase shifters 13Ca are twelve in the figure, however this is not for limiting the present invention. The numbers of them may be large, for example, one hundred. When the number of channel waveguides 12Ca of the array waveguide is M (M is a positive integer) and the channel waveguide number assigned in the arrangement order of the channel waveguides 12Ca is k (K=0 to M-1), for example, the set phase distribution of the tunable dispersion compensator 10C is even function distribution which is substantially in line symmetry with respect to the center (M-1)/2 of the channel waveguide number k.

The operation in the optical circuit device 100C starts with an incoming light beam input from the circulator 200 through the SMF 300 being split into a TE polarization beam and a TM polarization beam by the polarization beam splitter/combiner 20A. The split TE polarization beam is branched by the slab waveguide 11C and input to the array waveguide 12C, and the branched light beams are made to pass through the respective channel waveguide 12Ca, subjected to adjustment of the phases by the respective phase shifters 12Ca, and combined by the slab waveguide 14C. The combined TE polarization beam is changed into a TM polarization beam by the half wave plate 30A and input the polarization beam splitter/combiner 20A. On the other hand, the TM polarization beam split by the polarization beam splitter/combiner 20A is changed into a TE polarization beam by the half wave plate 30A, and the TE polarization beam is branched by the slab waveguide 14C. The branched TE polarization beams are made to pass through the respective channel waveguides 12Ca, subjected to adjustment of the respective phases by the respective phase shifters 13Ca, and combined by the slab waveguide 11C. The combined TE polarization beam is input to the polarization beam splitter/combiner 20A. In the polarization beam splitter/combiner 20A, the input TE polarization beam and TM polarization beam are combined to be output to the circulator 200 via the SMF 300.

FIG. 7 illustrates tunable dispersion characteristics relative to the relative wavelengths in the configuration using the optical circuit device 100C. As illustrated in FIG. 7, tunable dispersion is also obtained in the configuration using the optical circuit device 100C. The insertion loss is then about 3.5 dB and presents about 1.0 dB lower loss than the configuration without the optical circuit device 100C. This loss includes a propagation loss of circuits in the optical circuit device 100C, excess loss of the circuit, and a connection loss of SMF 300 and the circulator 200.

FIG. 8 illustrates transmittance wavelength profiles when the maximum dispersion is set in the configuration using the optical circuit device 100C. As illustrated in FIG. 8, PDL of the optical circuit device 100C is 0.5 dB or less, and use of the optical circuit device 100C shows significant reduction of the PDL. Besides, the polarization extinction ratio of the cascaded polarization beam splitter/combiner 20A is 40 dB or more.

From this example, it is revealed that the insertion loss and PDL can be reduced also in the optical circuit device 100C using the tunable dispersion compensator 10C.

Here, the optical circuit used in the tunable dispersion compensator is not limited to the configuration using an AWG. Also can be used an optical circuit formable on the PLC such as an optical circuit using a lattice filter and an optical circuit using a ring oscillator.

EXAMPLE 4

Figure 9:
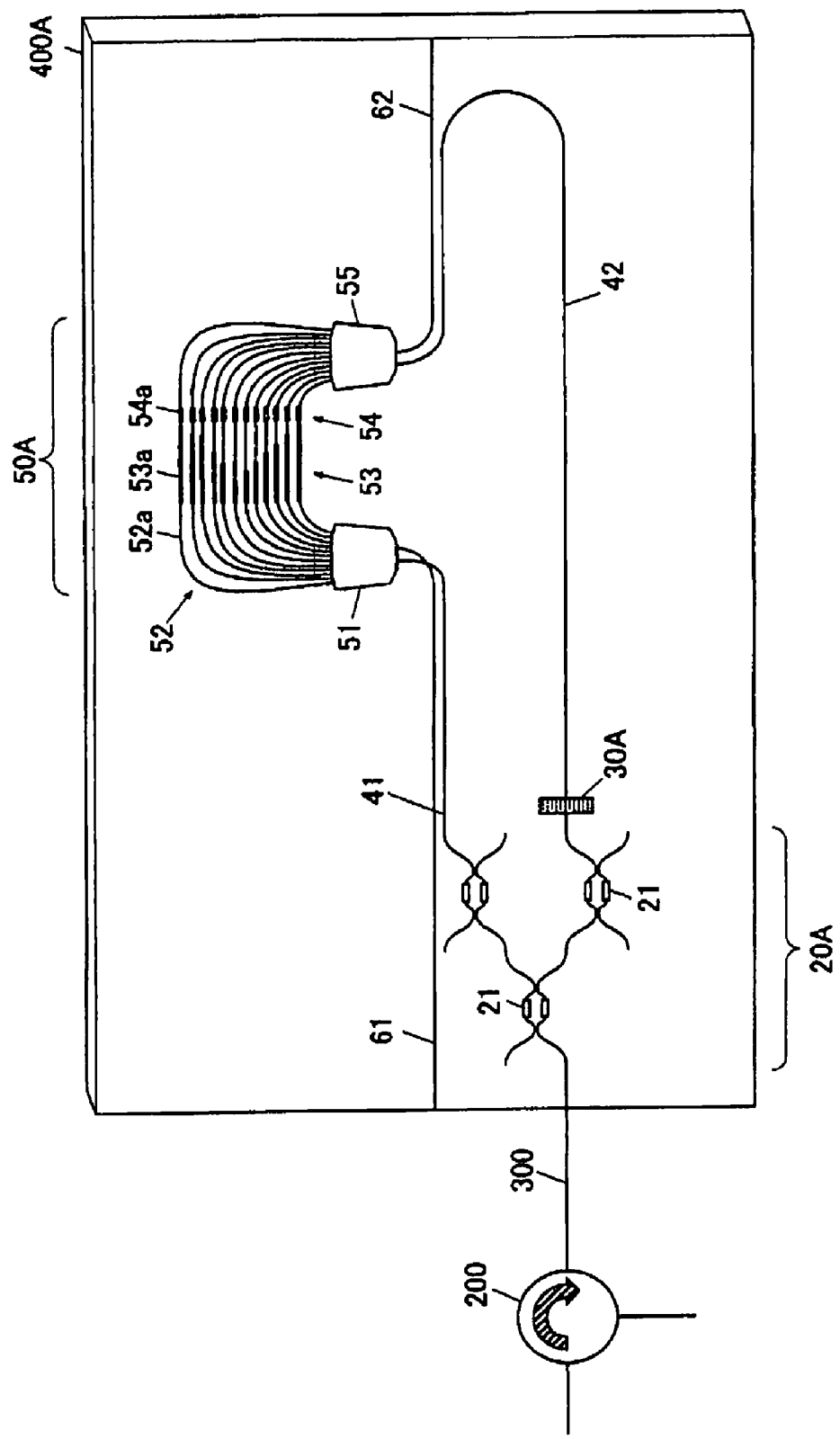
FIG. 9 is a view illustrating a configuration of an optical circuit device 400A as an example 4 according to the second embodiment.

With reference to FIGS. 9 to 13, described as a specific example 4 of the above-described second embodiment is a configuration where a tunable dispersion compensator of polarization diversity configuration having characteristic adjusting function is applied to the optical circuit 50 of the optical circuit device 400 of FIG. 2. FIG. 9 illustrates the configuration of the optical circuit device 400A of this example.

As illustrated in FIG. 9, the optical circuit device of this example is configured by providing a tunable dispersion compensator 50A using AWG as the optical circuit 50, a polarization beam splitter/combiner 20A as the polarization beam splitter/combiner 20 and a half wave plate 30A as the polarization rotator in the optical circuit device 400 of FIG. 2.

The tunable dispersion compensator 50A has a slab waveguide linked to an optical waveguide 41 and an input waveguide 61, an array waveguide 52 having plural channel waveguides 52a, a phase adjusting unit 53 having plural phase shifters 53a provided on the respective channel waveguides 52a, characteristic adjusting unit 54 having plural characteristic adjusting heaters 54a provided on the respective channel waveguides 52a, and a slab waveguide 55 connected to an optical waveguide 42 and an output waveguide 62.

Further, the tunable dispersion compensator 50A has a configuration different from that of the tunable dispersion compensator 10C of the above-described example 3. In the tunable dispersion compensator 50A, a first input waveguide connected to a side face of the slab waveguide 51 at the outer side of the array waveguide 52 relative to the focal point of the slab waveguide 51 and a first output waveguide formed at a side face of the slab waveguide 55 at the inner side of the array waveguide 52 relative to the focal point of the slab waveguide 55 are defined as a first group of input/output waveguide. Besides, a second input waveguide connected to a side face of the slab waveguide 51 at a position symmetrical to that of the first input waveguide relative to the focal point of the slab waveguide 51 and a second output waveguide connected to a side face of the slab waveguide 55 at a position symmetrical to that of the first output waveguide relative to the focal point of the slab waveguide 55 are defined as a second group of input/output waveguides.

The first input waveguide and the first output waveguide are connected to the polarization beam splitter/combiner 20A via the optical waveguide 41 and the optical waveguide 42, respectively. The second input waveguide and the second output waveguide are connected to the monitor input waveguide 61 and the monitor output waveguide 62, respectively, which are formed at two different chip side faces. With such a configuration that has two groups of input/output waveguides formed in symmetry relative to the respective focal points of the slab waveguides, transmittance of light input from the first input waveguide to the AWG circuit and output from the first output waveguide is almost identical to that of light input from the second input waveguide and output from the second waveguide.

Accordingly, by inputting test light to the first input waveguide of the tunable dispersion compensator 50A by use of the monitor input waveguide 61 and extracting and measuring light output from the first output waveguide from the monitor output waveguide 62, it is possible to measure transmittance of the tunable dispersion compensator 50A formed in the PLC optical circuit device 400A without using the circulator 200.

In addition, in the tunable dispersion compensator 50A, the characteristic adjusting heaters 54a, different from heaters for dispersion tuning (phase shifters 53a) are formed on the respective channel waveguides 52a. With use of these characteristic adjusting heaters 54a, it becomes possible to compensate a phase difference between array waveguides by local heating phase trimming technique disclosed in the document (M. Abe et al., Electronics Letters Vol. 32, No. 19, September 1996).

Figure 10A:
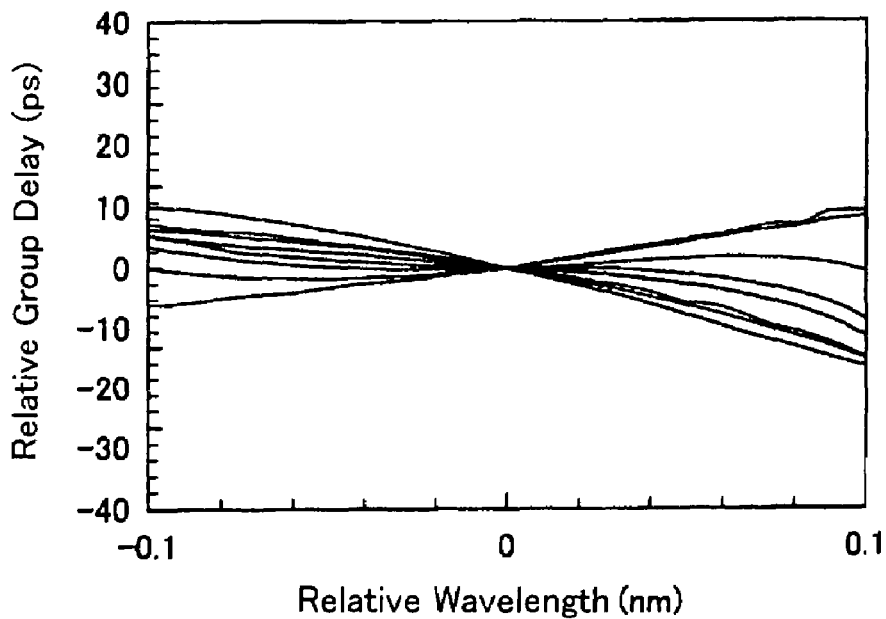
FIG. 10(a) is a graph of tunable dispersion relative to relative wavelengths of the tunable dispersion compensator 50A measured by use of a monitor input waveguide 61 and a monitor output waveguide 62.
Figure 10B:
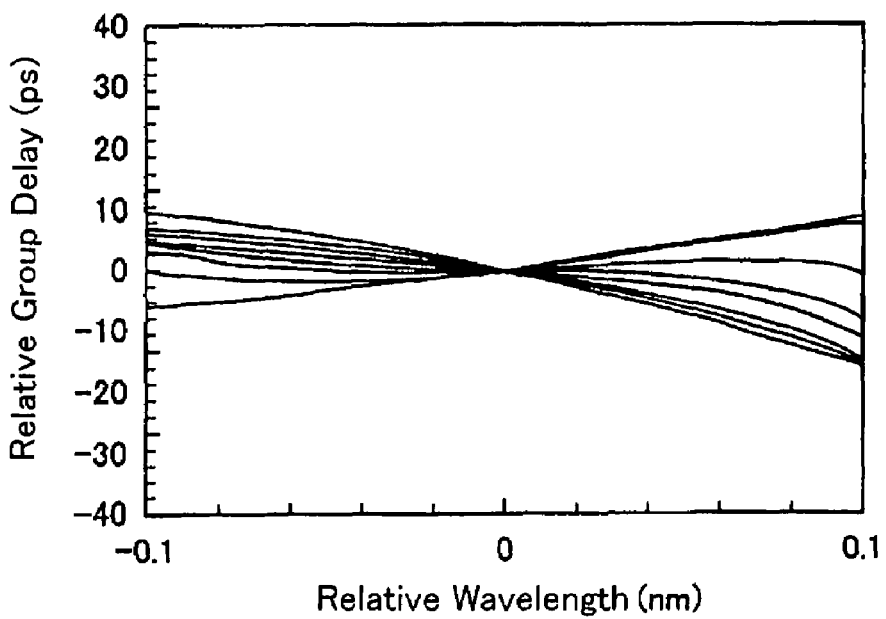
FIG. 10(b) is a graph of tunable dispersion relative to the relative wavelengths of the tunable dispersion compensator 50A using polarization diversity.
Figure 11A:
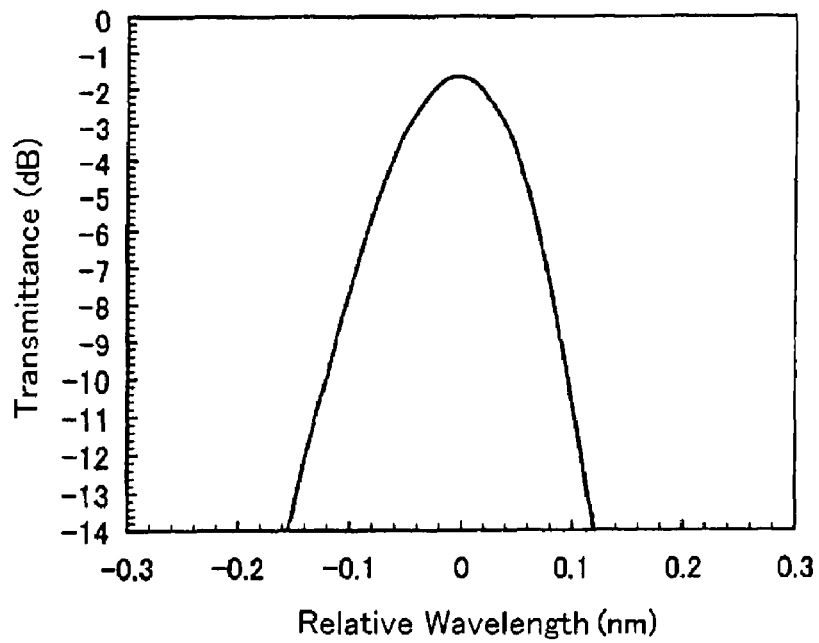
FIG. 11(a) is a graph of transmittance of the tunable dispersion compensator 50A using the monitor input waveguide 61 and the monitor output waveguide 62.

Next description is made, with reference to FIGS. 10(*a*), 10(*b*), 11(*a*) and 11(*b*) about tunable dispersion and transmittance of the tunable dispersion compensator obtained by inputting test light of TE polarization light from the monitor waveguide 61 with use of the PMF and measuring light output from the monitor output waveguide 62, and tunable dispersion and transmittance of the tunable dispersion compensator 50A in the configuration where a light signal is split and combined through the polarization beam splitter/combiner 20A in the optical circuit device 400A after the circulator 400 is installed (polarization diversity configuration). FIG. 10(*a*) shows the tunable dispersion relative to relative wavelengths of the tunable dispersion compensator 50A measured by use of the monitor input waveguide 61 and the monitor output waveguide 62. FIG. 10(*b*) shows the tunable dispersion relative to the relative wavelengths of the tunable dispersion compensator 50A measured by use of polarization diversity. FIG. 11(*a*) shows transmittance of the tunable dispersion compensator 50A measured by use of the monitor input waveguide 61 and the monitor output waveguide 62. FIG. 11(*b*) shows the transmittance of the tunable dispersion compensator 50A measured by use of polarization diversity.

As shown in FIG. 10(*a*), the tunable dispersion profile of the tunable dispersion compensator 50A obtained by inputting test light of TE polarization beam from the monitor input waveguide 61 and measuring light output from the monitor output waveguide 62 is almost the same as the tunable dispersion profile measured by using polarization diversity shown in FIG. 10(*b*) and it is confirmed that the dispersion characteristics can be obtained without the circulator 200.

Figure 11B:
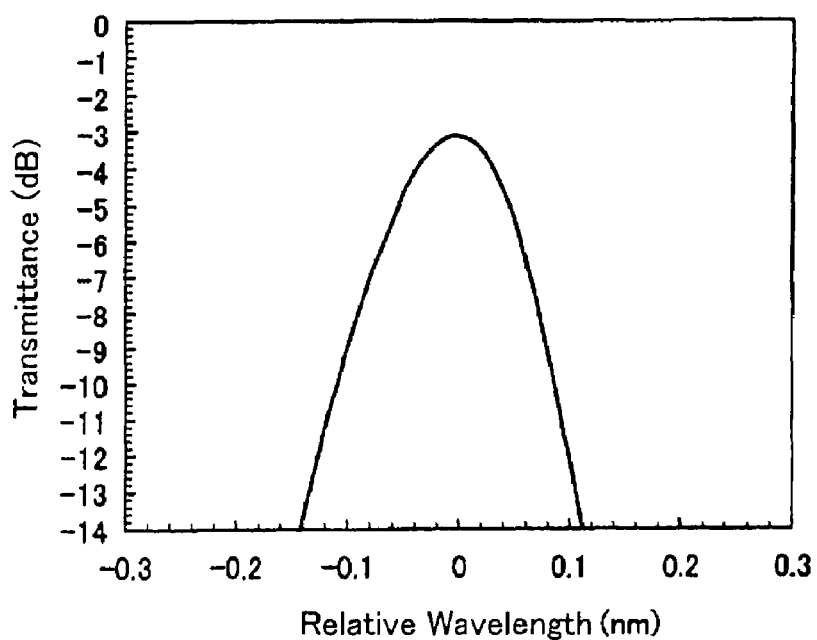
FIG. 11(b) is a graph of transmittance of the tunable dispersion compensator 50A using polarization diversity.

In addition, a illustrated in FIG. 11(*a*), the transmittance of the tunable dispersion compensator 50A obtained by inputting test light of TE polarization beam from the monitor input waveguide 61 and measuring light output from the monitor output waveguide 62 is totally about 1.5 dB smaller than the transmittance measured by using polarization diversity shown in FIG. 11(b) as the light does not pass through the circulator 200 and the polarization beam splitter/combiner 20A. However, these cases present almost the same transmittance profile and it is confirmed that the transmittance characteristics can be also obtained.

Figure 12:
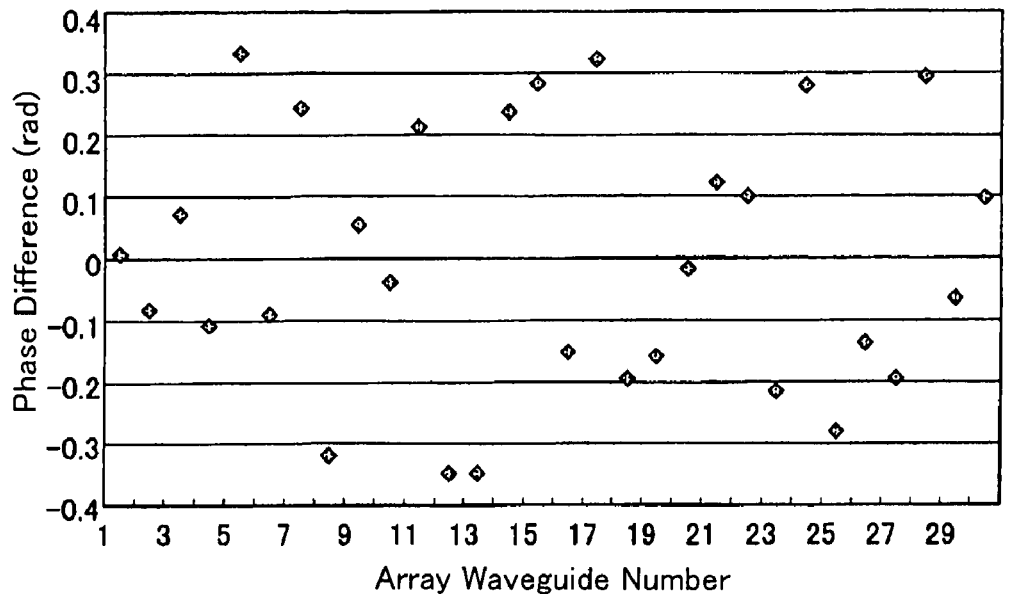
FIG. 12 is a graph of phase difference distribution relative to array wavelength numbers of the tunable dispersion compensator 50A measured by use of the monitor input waveguide 61 and the monitor output waveguide 62.
Figure 13:
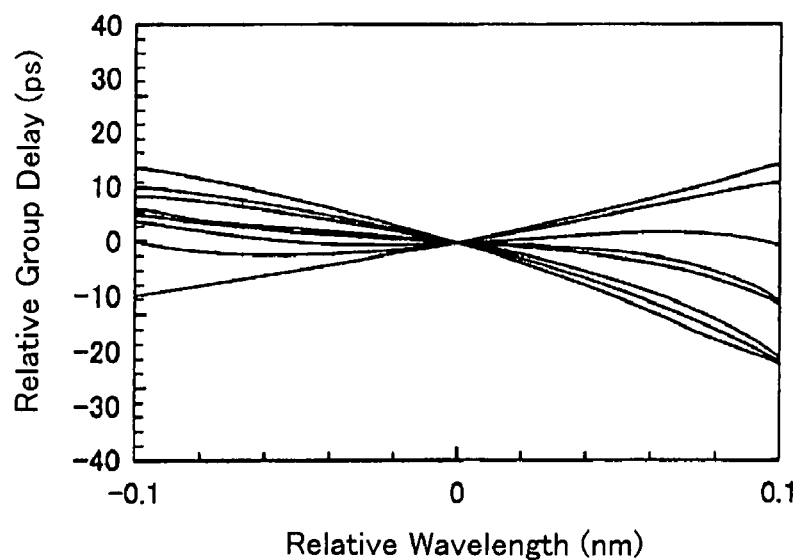
FIG. 13 is a graph of tunable dispersion after compensation of the phase difference in the tunable dispersion compensator 50A measured by use of the monitor input waveguide 61 and the monitor output waveguide 62.
Figure 14A:
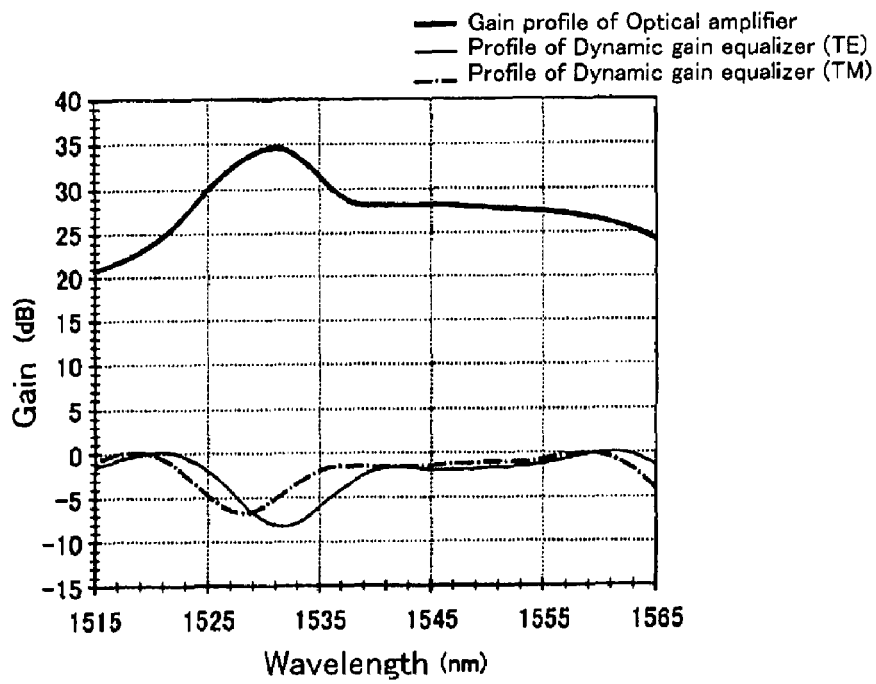
FIG. 14(a) is a graph of gain profiles of an optical amplifier and a dynamic gain equalizer relative to wavelengths in the conventional dynamic gain equalizer.
Figure 14B:
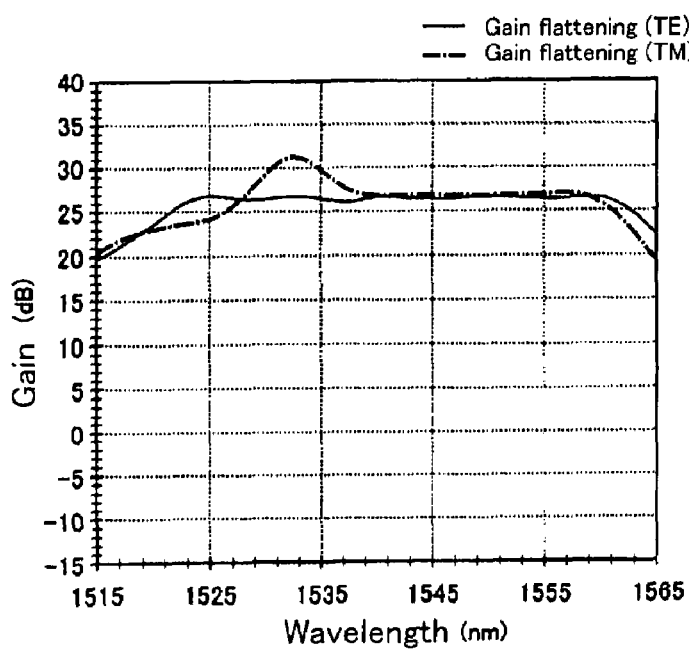
FIG. 14(b) is a view of gain flattening profiles similarly relative to wavelengths.

Next description is made, with reference to FIGS. 12 and 13, about measurement of a phase difference of an array waveguide and correction of the same by low-coherence optical interference reported in the document (H. Yamada et al., J. Lightwave Technology, vol. 16, No. 3, March 1998) with use of the monitor input waveguide 61 and the monitor output waveguide 62 in the optical circuit device 400A. FIG. 12 shows distribution of phase differences relative to array waveguide numbers of the tunable dispersion compensator 50A. The array waveguide numbers are numbers assigned to the respective channel waveguides 52a of the array waveguide 52 of the tunable dispersion compensator 50A.

It is seen from FIG. 12 that there occur phase difference of about 0.34 rad at the maximum between the channel waveguides 52a. Such phase differences disturb the phase distribution profile formed by the phase shifters 53a of the channel waveguides 52a and reduce a tunable dispersion amount. Then, based on this result, the power supplied and supply time to the characteristic adjusting heaters 54a formed on the respective channel waveguides 52a are determined to correct the phase differences of the array waveguide 52. FIG. 13 shows tunable dispersion after phase difference correction in the tunable dispersion compensator 50A, which is measured by using the monitor input waveguide 61 and the monitor output waveguide 62.

As illustrated in FIG. 13, the tunable dispersion of the tunable dispersion compensator 50A measured by using the monitor input waveguide 61 and the monitor output waveguide 62 is about −190 to +130 [ps/nm] and show significant improvement as compared with the dispersion before correction of −130 to +80 [ps/nm] as shown in FIG. 10(a).

As, in this example, the monitor input waveguide 61 and the monitor output waveguide 62 are provided, the characteristics of the tunable dispersion compensator 50A can be measured without the circulator 200 nor the polarization beam splitter/combiner 20A. The characteristics of the optical circuit as a single body can be measured in advance and fine phase adjustment becomes possible.

EXAMPLE 5

Figure 16:
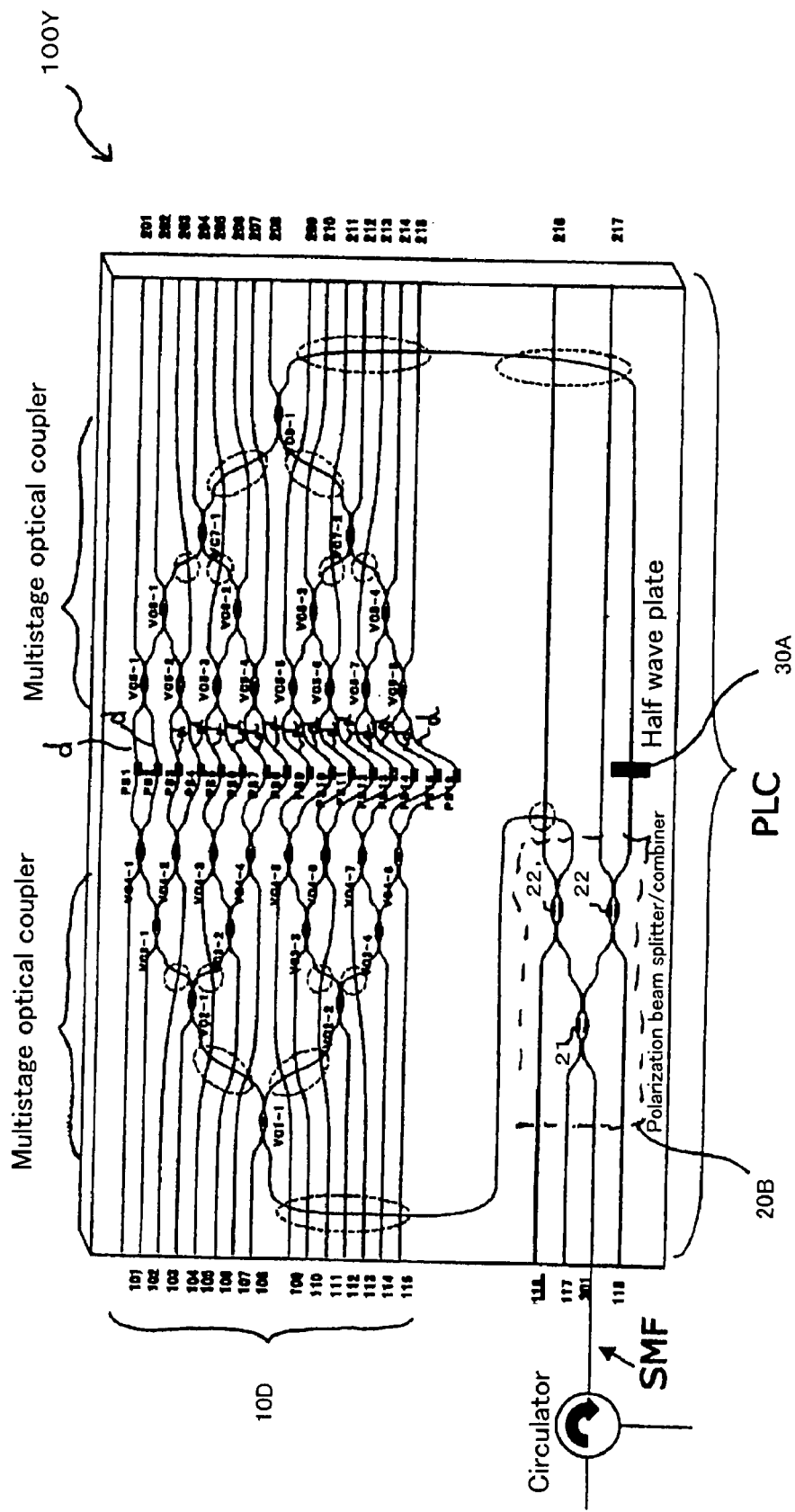
FIG. 16 is a view illustrating a configuration of an optical circuit device 100Y as an example 5 according to the first embodiment.
Figure 17:
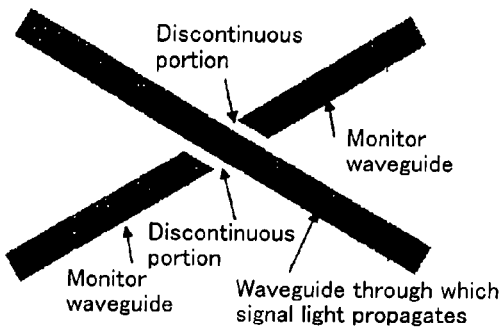
FIG. 17 is a diagram of an intersection between a waveguide through which light propagates and a monitor port waveguide.

Next description is made with reference to FIG. 16, about the configuration in which a tunable dispersion compensator using an optical transversal fiber circuit is applied to the optical circuit 10 of FIG. 1, as a specific example 5 of the first embodiment. FIG. 16 illustrates the configuration of an optical circuit device 100Y of this example.

As illustrated in FIG. 16, the integrated PLC type optical circuit device 100Y of this example is configured by adding a tunable dispersion compensator 10D as the optical circuit 10, a polarization beam splitter/combiner 20B as the polarization beam splitter/combiner 20 and a half wave plate 30A as the polarization rotator 30 to the optical circuit device 100 of FIG. 1.

The polarization beam splitter/combiner 20B has optical couplers 21 and 22, each as optical circuit having the polarization beam splitting and combining function, cascaded at two stages in one substrate. In this example, the connection path is designed in such a manner a light beam output from the through port in the optical coupler 21 is output from the cross port in the optical coupler 22 while a light beam output from the cross port in the optical coupler 21 is output from the through port of the optical coupler 22. This design enables a high polarization extinction ratio to be obtained over a wide range of wavelengths as compared with the through port—through port connection used in the polarization beam splitter/combiner 20A of the example 1.

In the optical couplers 21 and 22, an effective length difference of the two optical waveguides is in two electric field components orthogonal to each other, different by an integral multiple of incoming light beam wavelength for one electric field component and different by (an integral+½) multiple of the incoming light beam wavelength for the other electric field component. Here, the effective length difference is set in such a manner that a light beam output from the through port in the optical coupler 21 is output from the cross port in the optical coupler 22 while a light beam output from the cross port in the optical coupler 21 is output from the through port of the optical coupler 22.

For example, in the optical coupler 21, the effective length difference is different by an integral multiple of the incoming light beam wavelength for TE polarization beam and the TE polarization beam is output from the cross port, while in the optical coupler 22 the effective length difference is different by (an integral+½) multiple of the incoming light beam wavelength for TE polarization beam and the TE polarization beam is output from the through port. Then, in the optical coupler 21, the effective length difference is different by (an integral+½) multiple of the incoming light beam wavelength for TM polarization beam and the TE polarization beam is output from the through port, while in the optical coupler 22 the effective length difference is different by an integral multiple of the incoming light beam wavelength for TM polarization beam and the TM polarization beam is output from the cross port.

Of two optical input terminals in the optical couplers 21 and 22, an optical input terminal not connected together is connected to a chip side face as characteristic adjusting monitor ports 101 to 107 and 110 to 115.

In addition, formed on the optical couplers 21 and 22 are thin film heaters each as means for adjusting the effective length difference by changing the refractive index of a waveguide by thermo-optic effect. As illustration is omitted for ease of description, each of the thin film heaters is supplied with power by an electric wiring of meal thin film and at each side of each thin film heater a heat insulating groove is formed by removing an optical waveguide film up to the substrate in order to reduce power consumption.

The tunable dispersion compensator 10D of this example as illustrated in FIG. 16 is fabricated by silica-based planar optical waveguide and includes a multistage optical coupler having optical couplers VCx-x (x-x is an arbitrary value of from 1-1 to 4-8) of 2-input and 2-output type MZI circuits connected in tree structure, a multistage optical coupler having optical couplers VCy-y (y-y is an arbitrary value of from 5-1 to 8-1) of 2-input and 2-output type MZI circuits connected in reverse tree structure, sixteen optical delay lines d, provided between the respective output terminals of the optical couplers VCx-x and the respective input terminals to the optical couplers VCy-y, for delaying the propagation time of propagating light by a set time and sixteen phase shifters PS1 to PS16. The optical delay lines d are provided in parallel, spaced from each other and configured of optical transversal filter circuits formed longer by a set amount than the previous one from one side to the other.

In addition, formed on the optical couplers VCx-x and VCy-y are thin film heaters each as light branching ratio adjusting means for adjusting the branching ratio by changing the refractive index of a waveguide by thermo-optic effect. As illustration is omitted for ease of description, each of the thin film heaters is supplied with power by an electric wiring of meal thin film and at each side of each thin film heater a heat insulating groove is formed by removing an optical waveguide film up to the substrate in order to reduce power consumption.

Further, formed on the optical delay lines 6 are thin film heaters as phase adjusting means for adjusting by the thermo-optic effect the phase of light propagating through the respective optical delay lines d, which constitute phase shifters PS1 to PS16.

Further, in the optical transversal filter circuits, one of the two optical input terminals in the first-stage optical coupler VC1-1 is connected to the optical coupler 22 and the other is connected to the chip side face as an optical input port 108. Further, one of the two optical output terminals in the last-stage optical coupler VC8-1 is connected to the optical coupler 22 and the other corresponds to the optical input port 104 and is connected to the chip side face as an optical output port 208.

Of two optical input terminals in each of second and later-stage optical couplers VCx-x, one optical input terminal which is not connected to the previous-stage optical coupler VCx-x is connected to the chip side face as monitor ports 101 to 107 and 110 to 115. Likewise, of two optical output terminals in each of second and later-stage optical couplers VCy-y, one optical output terminal which is not connected to the previous-stage optical coupler VCy-y is connected to the chip side face as monitor ports 201 to 207 and 210 to 215.

In this configuration, as test light is input to the monitor input waveguide and light output from the monitor output waveguide is measured, it is possible to measure characteristics of the phase shifters PSx, the optical couplers VCx-x and the optical couplers VCy-y of the tunable dispersion compensator and the optical couplers 21 and 22.

With use of the thus obtained characteristics, the power fed to the heaters of the optical couplers 21 and 22 can be adjusted, and the effective length difference can be adjusted. Therefore, even if there occurs a difference from the design due to the fabrication error in the optical couplers 21 and 22, it is possible to reduce deterioration of the characteristics of the polarization beam splitter/combiner 20B by adjustment.

Further, with use of the thus obtained characteristics, the power supply to the thin film heaters on the respective MZI circuits of the multistage optical couplers VCx-x and the multistage optical couplers VCy-y is controlled appropriately and a connection rate of each MZI circuit is varied, the optical amplitude of the sixteen optical paths (taps) is allowed to be controlled freely. Furthermore, by controlling the power supply to the thin film heaters on the optical delay lines d, the phase of each of the taps is allowed to be controlled freely. Therefore, it becomes possible to arrange the characteristics of the tunable dispersion compensator 10D.

As illustrated by a broken-line box in FIG. 16, when the tunable dispersion compensator 10D is used actually, intersections of waveguides through which signal light propagates and monitor waveguides are increased in number and this may causes a problem of a radiation loss at the intersections.

Here, when the tunable dispersion compensator 10D is used actually, as the signal light propagates through each of the connected waveguides, this may causes a problem of an insertion loss. However, as the monitor waveguides are only used to measure the characteristics of the optical couplers and the like and not used to make signal light pass therethrough, if the loss increases, this does not become a problem unless there occur any problems in measurement of characteristics.

Then, in this example, at the intersections of the waveguides through which signal light propagates and monitor waveguides, discontinuous portions are provided on the monitor waveguides so that the waveguides through which signal light propagates and the monitor waveguides are not connected and separated from each other. The side faces of the respective discontinuous portions of the monitor waveguides are arranged in parallel to those of the waveguides through which signal light propagates.

With this configuration, as there is no contact portion with the monitor waveguides at each of the paths of signal light input from the input/output port 301 and output from the input/output port 301, it is possible to prevent insertion loss from being increased.

The integrated PLC type optical circuit device 100Y of this example shown in FIG. 16 is fabricated as follows.

First, on a silicon substrate, an optical transversal filter circuit of a silica based optical waveguide is formed by the flame hydrolysis deposition method (FHD method) and the reactive ion etching (RIE). The refractive index difference of the waveguide is 1.5%, and the core size is 5 μm×5 μm. Then spattering is performed to form thin film heaters and a power supply electrode. This is followed by forming a heat insulating groove by RIE. Finally, dicing is performed to cut out a chip.

Figure 18:
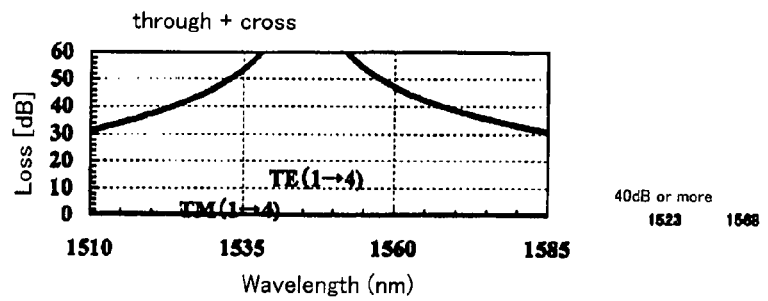
FIG. 18 is a graph of polarization extinction ratio of a polarization beam splitter/combiner 20B of the example 5 (through port-cross port)
Figure 19:
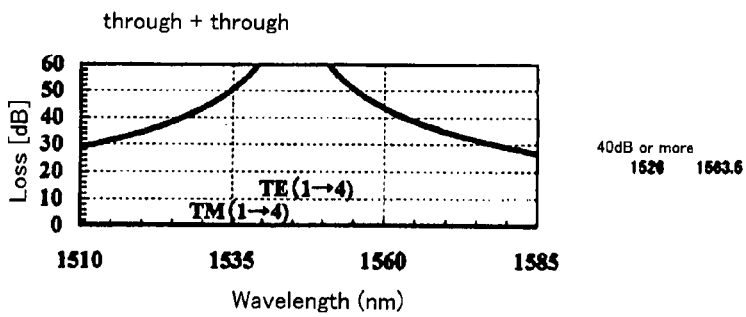
FIG. 19 is a graph of polarization extinction ratio of a polarization beam splitter/combiner 20A of the example 1 (through port-cross port)

The profile of the fabricated polarization beam splitter/combiner 20B (through port—cross port connection) is shown in FIG. 18. As seen from FIG. 18, the polarization extinction ration of 40 dB and more is obtained over wavelengths 1523 to 1568 nm. For comparison, the profile of the polarization beam splitter/combiner 20A fabricated in the example 1 (through port—through port connection) is shown in FIG. 19. As seen from FIG. 19, the polarization extinction ration of 40 dB and more is obtained over wavelengths 1526 to 1564 nm. In both of the cases, the high polarization extinction ratio of 40 dB and more is obtained at a wide wavelength range of 38 nm or more. When both cases are compared, the high polarization extinction ratio is obtained over a wider wavelength range for the through port—cross port connection than that for the through port—through port connection.

The various parameters used in fabricating of the tunable dispersion compensator using the transversal filter circuit of this example are shown in Table 1.

TABLE 1

| | |
|---|---|
| Number of Optical delay lines (taps) | 8 |
| Length difference of optical delay lines ΔL | 2055 |
| Free spectrum range FSR | 100 GHz |
| Center wavelength λc | 1545 nm |

Figure 20:
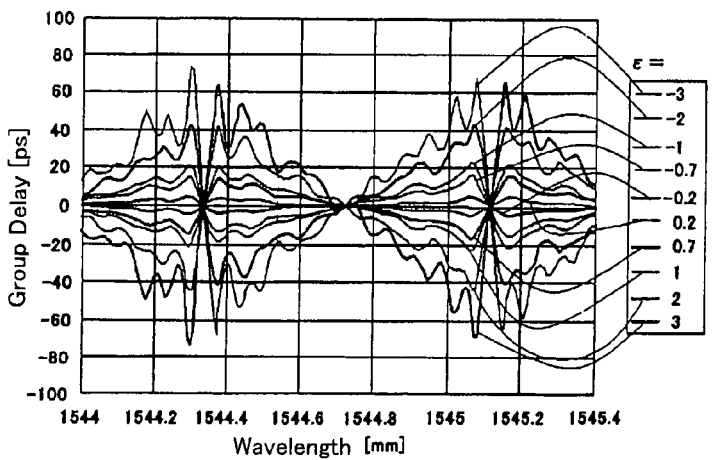
FIG. 20 is a characteristic view showing a group delay spectrum measurement result of the tunable dispersion compensator 10D of the example 5.
Figure 21:
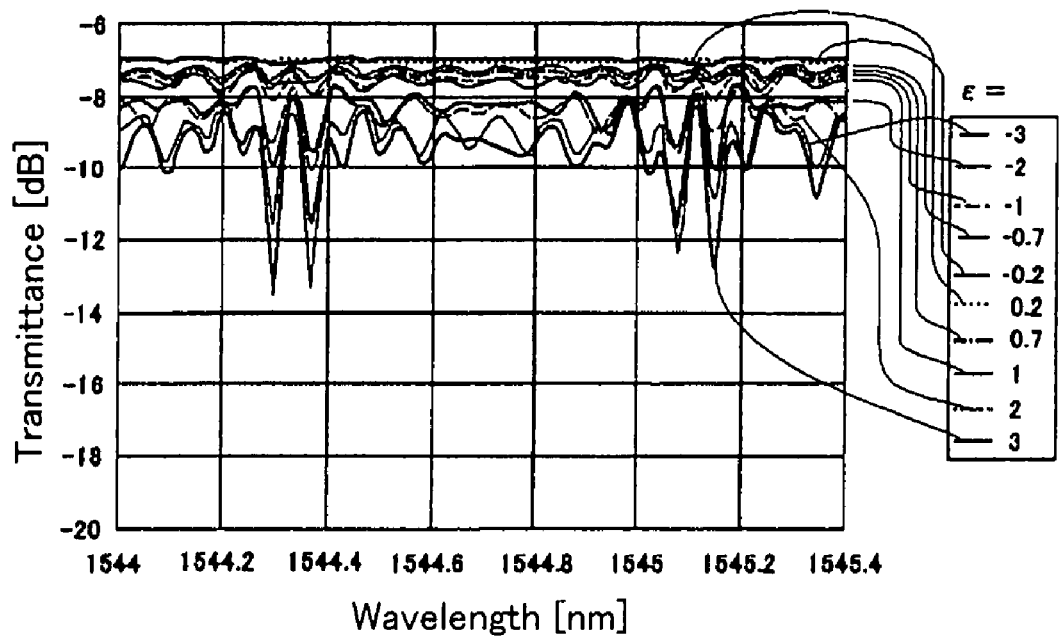
FIG. 21 is a characteristic view showing a loss spectrum measurement result of the tunable dispersion compensator 10D of the example 5.
Figure 22:
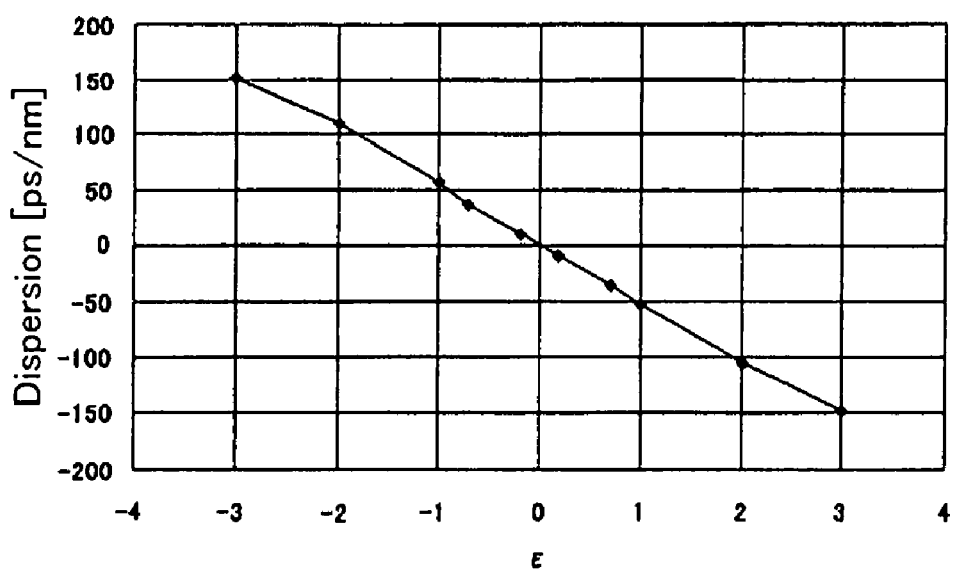
FIG. 22 is a characteristic view of pass bandwidth and dispersion fluctuation relative to a coefficient ε in the example 5.

Group delay spectra of the thus obtained tunable dispersion compensator are shown in FIG. 20 and insertion spectra are shown in FIG. 21. The pass bandwidth and wavelength distribution fluctuations for the coefficient ε are shown in the graph of FIG. 22. As is seen from these graphs, at the coefficient ε=±2.0, the wavelength dispersion is about±105 ps/nm, the pass band is about 0.6 nm, the minimum loss within the band is about 7.7 dB and loss fluctuation within the band is about 1.2 dB or less.

Here, in the above-described examples 1 to 5, used as the optical circuit 10 of the first embodiment are the dynamic gain equalizers 10A and 10B and the tunable dispersion compensators 10C and 10D. However, the optical circuit 10 is not limited to them. For example, a dynamic gain equalizer or a tunable dispersion compensator of another configuration, another transversal filter, variable optical attenuator, optical switch or other optical circuits using thermo-optic effect and having the characteristic adjusting functions may apply to the optical circuit 10.

Further in the above-described example 4, the tunable dispersion compensator 50A is applied to the optical circuit 50 of the second embodiment, however, the optical circuit 50 is not limited to this. For example, a dynamic gain equalizer, a tunable dispersion compensator of another configuration, another transversal filter, variable optical attenuator, optical switch or other optical circuits using thermo-optic effect and having the characteristic adjusting functions may apply to the optical circuit 50.

Furthermore, any modifications alternations can be made to detailed configurations of respective components of an optical circuit device in the above-described embodiments and their variations without departing from the subject of the present invention.

The invention claimed is:

1. An optical circuit device comprising:
   an optical circuit;
   a polarization beam splitter/combiner configured to split an incoming light beam into two polarization beams and to combine the two polarization beams into an outgoing light beam, said polarization beam splitter/combiner including polarization beam splitting/combining circuits each having a polarization beam splitting/combining function, the polarization beam splitting/combining circuits being cascaded at least two stages on the planar substrate;
   a first optical waveguide and a second optical waveguide configured to connect said optical circuit and said polarization beam splitter/combiner and to receive the two polarization beams independently; and
   a polarization rotator, arranged on the first optical waveguide, configured to rotate a polarization plane of one of the two polarization beams split by said polarization beam splitter/combiner so as to match a polarization plane of the other of the two polarization beams,
   said optical circuit, said polarization beam splitter/combiner, said first optical waveguide, said second optical waveguide and said polarization rotator being integrated on a planar substrate.

2. The optical circuit device of claim 1, wherein said polarization rotator is a half wave plate.

3. The optical circuit device of claim 1, wherein said optical circuit has a characteristic adjusting function by use of a thermo-optic effect.

4. The optical circuit device of claim 1, wherein said optical circuit is a dynamic gain equalizer.

5. The optical circuit device of claim 1, wherein said optical circuit is a transversal filter.

6. The optical circuit device of claim 1, wherein said optical circuit is a tunable dispersion compensator.

7. The optical circuit device of claim 1, wherein said optical circuit is a variable optical attenuator.

8. The optical circuit device of claim 1, wherein said optical circuit is an optical switch.

9. The optical circuit device of claim 1, further comprising a monitor input waveguide and a monitor output waveguide formed connected to said optical circuit in the planar substrate.

10. The optical circuit device of claim 1, wherein said optical circuit is a tunable dispersion compensator using a transversal filter circuit.

11. The optical circuit device of claim 1, wherein the polarization beam splitting/combining circuits cascaded are configured by connecting a through port and a cross port.

* * * * *